(12) United States Patent
Westerveld et al.

(10) Patent No.: US 11,320,303 B2
(45) Date of Patent: May 3, 2022

(54) ACOUSTICAL PRESSURE SENSOR WITH PHOTONIC WAVEGUIDE

(71) Applicants: IMEC VZW, Leuven (BE); KATHOLIEKE UNIVERSITEIT LEUVEN, Leuven (BE)

(72) Inventors: Wouter Jan Westerveld, Oud-Heverlee (BE); Roelof Jansen, Heverlee (BE); Xavier Rottenberg, Kessel-Lo (BE); Veronique Rochus, Embourg (BE)

(73) Assignees: IMEC VZW, Leuven (BE); KATHOLIEKE UNIVERSITEIT LEUVEN, Leuven (BE)

( * ) Notice: Subject to any disclaimer, the term of this patent is extended or adjusted under 35 U.S.C. 154(b) by 146 days.

(21) Appl. No.: 16/840,269

(22) Filed: Apr. 3, 2020

(65) Prior Publication Data
US 2020/0319019 A1 Oct. 8, 2020

(30) Foreign Application Priority Data
Apr. 4, 2019 (EP) ..................................... 19167206

(51) Int. Cl.
*G01H 9/00* (2006.01)
(52) U.S. Cl.
CPC ..................................... *G01H 9/004* (2013.01)
(58) Field of Classification Search
None
See application file for complete search history.

(56) References Cited

U.S. PATENT DOCUMENTS

| 2008/0095490 A1 | 4/2008 | Ashkenazi et al. |
| 2016/0273943 A1 | 9/2016 | Grubel |

FOREIGN PATENT DOCUMENTS

| WO | WO-2007/018552 A2 | 2/2007 |
| WO | WO-2007/018552 A3 | 2/2007 |
| WO | WO-2007018552 A2 | 2/2007 |

OTHER PUBLICATIONS

O'Donnell M. et al., Resonant Optical Ultrasound Transducer (ROUT) Arrays for High Resolution Photoacoustic Imaging, Proceedings of SPIE, vol. 6086, Feb. 9, 2006.

(Continued)

*Primary Examiner* — Lisa M Caputo
*Assistant Examiner* — Nigel H Plumb
(74) *Attorney, Agent, or Firm* — Moser Taboada

(57) ABSTRACT

Embodiments relate to a sensor structure for an acoustical pressure sensor and an opto-mechanical sensor and system that may be used for detecting acoustical pressure waves. Embodiments of a sensor structure for an acoustical pressure sensor include an optical waveguide closed-loop resonator and a plurality of sensor elements. The individual sensor elements of the plurality of sensor elements are configured to be affected by an acoustical pressure wave such that a physical property of the individual sensor element is changed. The optical waveguide closed-loop resonator is arranged at the plurality of sensor elements and associated with each of the individual sensor elements such that a resonance frequency of the optical waveguide closed-loop resonator is shifted due to the affected physical properties of all individual sensor elements. The sensor structure provides a high sensitivity from each sensor element, which is advantageous in e.g. ultrasonic imaging, such as photo-acoustic imaging where the signals typically are low.

15 Claims, 7 Drawing Sheets

(56) References Cited

OTHER PUBLICATIONS

Bogaerts W. et al., Silicon-on-Insulator spectral filters fabricated with CMOS technology, IEEE Journal on Selected Topics in Quantum Electronics, vol. 16, No. 1, Feb. 2010.
VisualSonics Inc., Vevo® LAZR Photoacoustic Imaging Platform, Listen to the Light, Brochure, 2011.
Zhao X. et al., A nano-opto-mechanical pressure sensor via ring resonator, Optics Express, vol. 20, No. 8, Mar. 28, 2012.
Westerveld W. J., Silicon Photonic Micro-Ring Resonators to Sense Strain and Ultrasound, Ph.D. thesis, Technische Universiteit Delft, Mar. 19, 2014.
Li H. et al., A transparent broadband ultrasonic detector based on an optical micro-ring resonator for photoacoustic microscopy, Scientific Reports, 4:4496, Mar. 28, 2014.
Leinders S.M. et al., A sensitive optical micro-machined ultrasound sensor (OMUS) based on a silicon photonic ring resonator on an acoustical membrane, Scientific Reports, 5:14328, Sep. 22, 2015.
Kolo Medical, SiliconWave™ Transducer Technology, Brochure, 2016.
Wang L. V. et al., A practical guide to photoacoustic tomography in the life sciences, Nature Methods, vol. 13, No. 8, Jul. 28, 2016.
Ovsepian S. V. et al., Pushing the Boundaries of Neuroimaging with Optoacoustics, Neuron, vol. 96, No. 5, Dec. 6, 2017.
Tiran E. et al., Transcranial Functional Ultrasound Imaging in Freely Moving Awake Mice and Anesthetized Young Rats Without Contrast Agent, Ultrasound in Medicine & Biology, vol. 43, No. 8, Mar. 20, 2017.
FUJIFILM VisualSonics Inc., Vevo™ LAZR-X High Resolution Multi-modal in vivo Imaging Platform, Brochure, 2017, pp. 1-12.
O'Donnell et al., "Resonant Optical Ultrasound Transducer (ROUT) Arrays for High Resolution Photoacoustic Imaging", Proceedings of SPIE, vol. 6086, p. 608604, XP055107122, https://doi.org/10.1117/12_857981, Mar. 6, 2006.
Zhao et al., "A nano-opto-mechanical pressure sensor via ring resonator", ASIC and System State Key Lab, Department of Microelectronics, Fudan University, Shanghai 20043, China, vol. 20, No. 8 xmii@fudan.edu.cn, Apr. 9, 2012.
Wouter Jan Westerveld, "Silicon Photonic Micro-Ring Resonators To Sense Strain and Ultrasound", IOP Photonic Devices programme of NL-Agency of the Dutch Ministry of Economic Affairs (project #IPD100026) and by TNO, http://repository.tudelft.nl, 2014.
Leinders et al., "A sensitive optical micro-machined ultrasound sensor (OMUS) based on a silicon photonic ring resonator on an acoustical membrane", Scientific Reports, vol. 5, No. 1, pp. 1-9, XP055586034, doi: 10.1038/srep14328, Sep. 22, 2015.

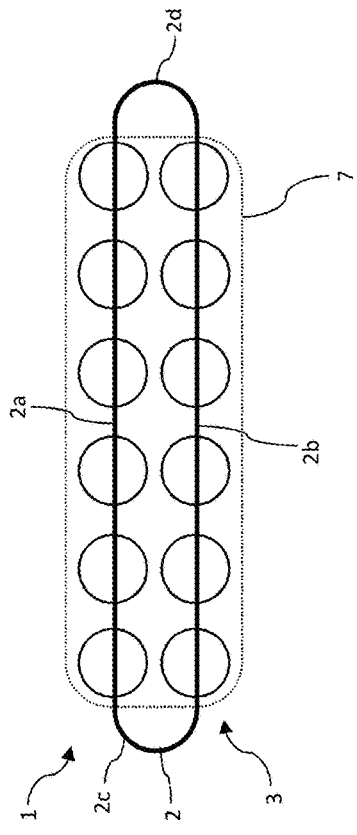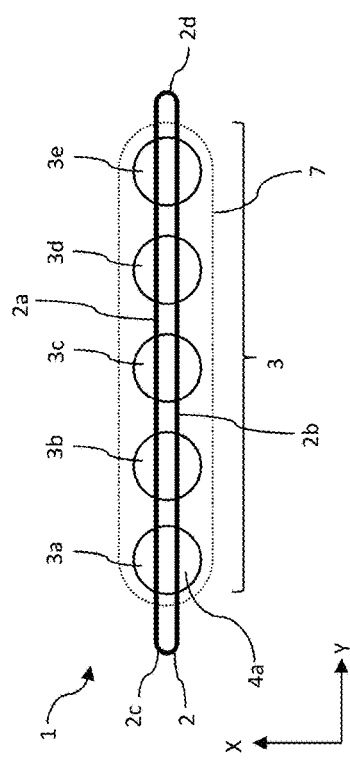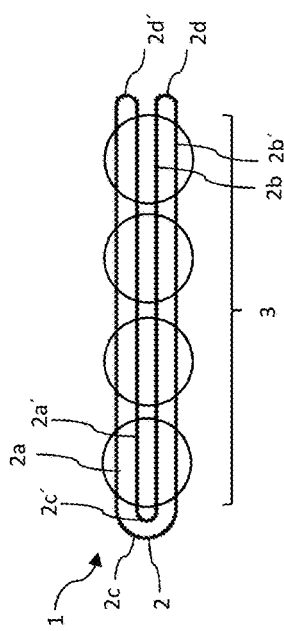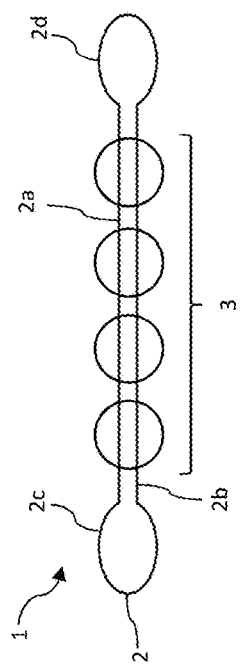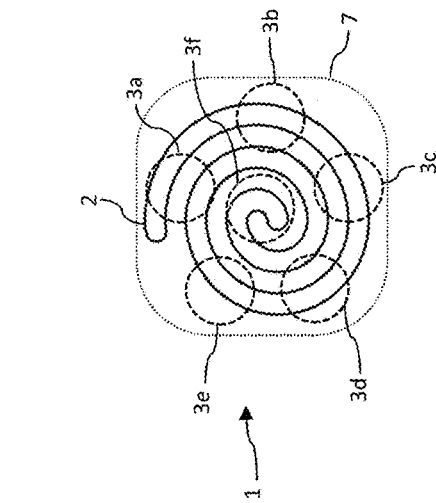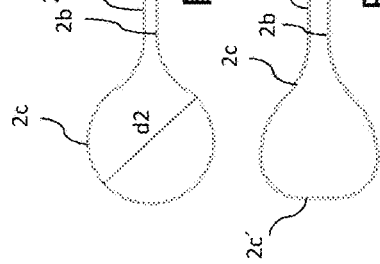
FIG. 1A
FIG. 1B
FIG. 1C
FIG. 1D
FIG. 1E
FIG. 1F
FIG. 1G

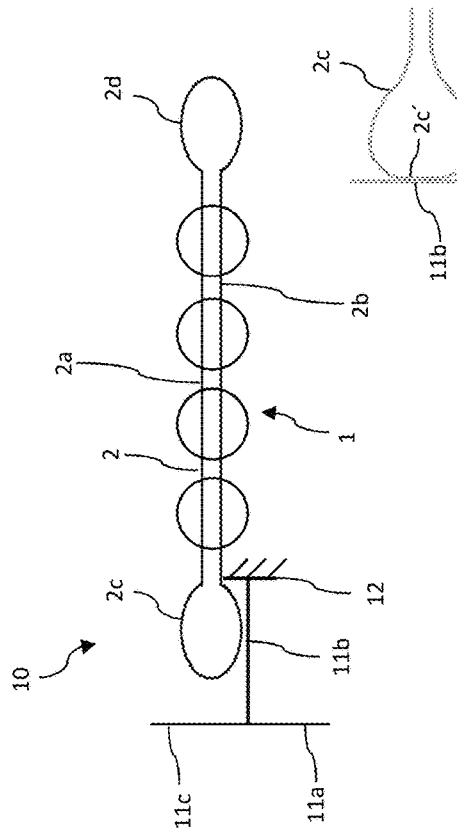
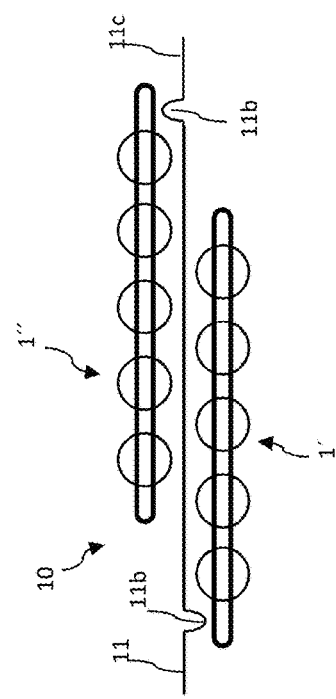
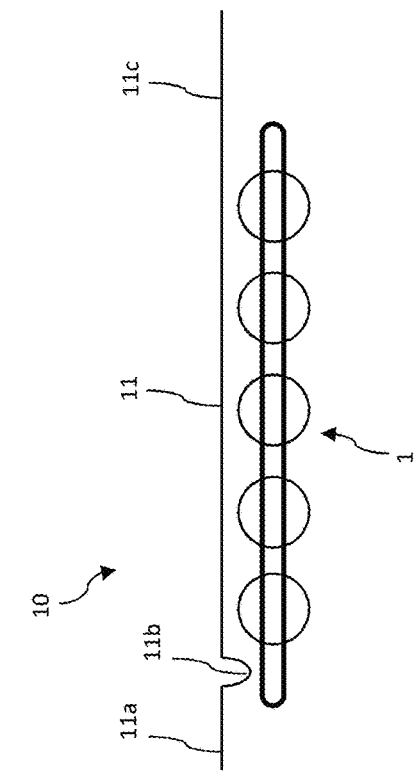
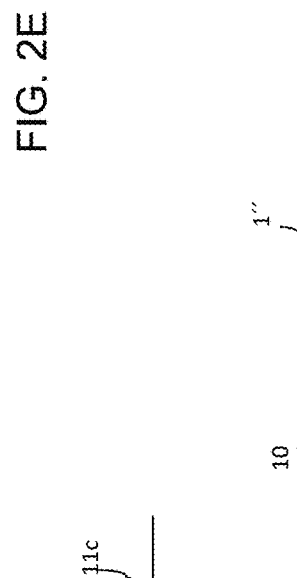
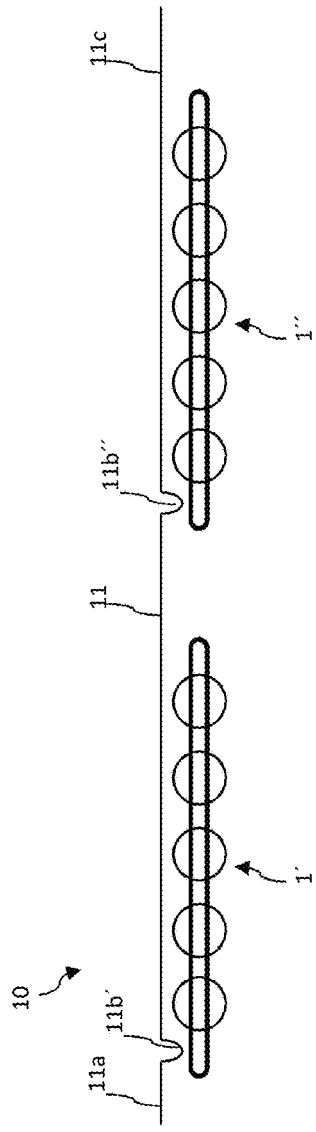
FIG. 2A
FIG. 2B
FIG. 2C
FIG. 2D
FIG. 2E

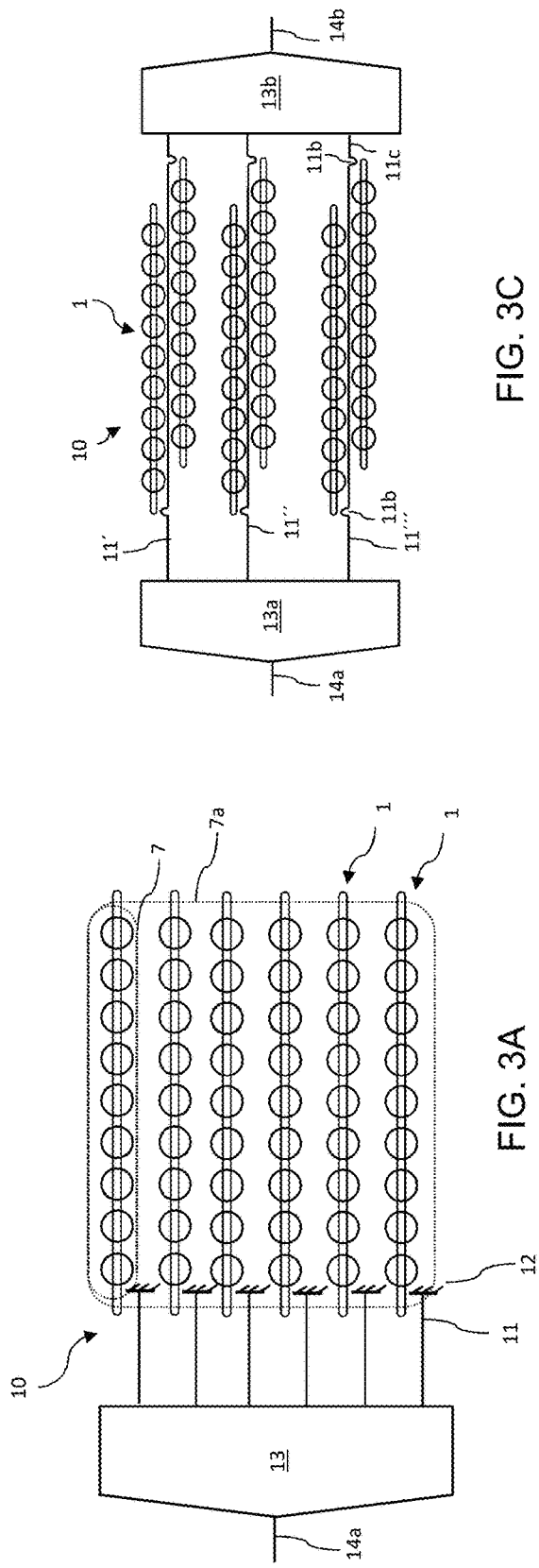
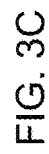
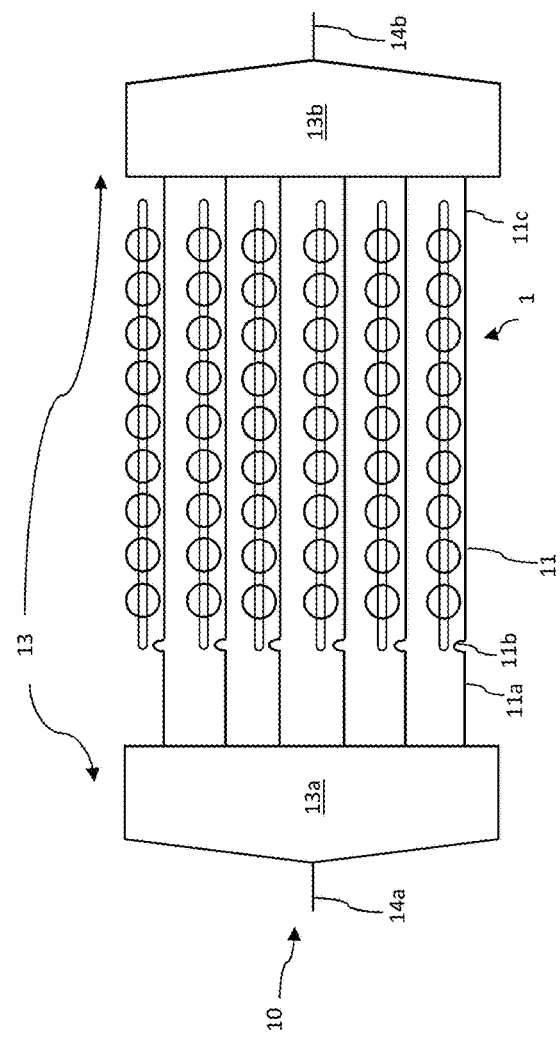
FIG. 3A
FIG. 3B
FIG. 3C

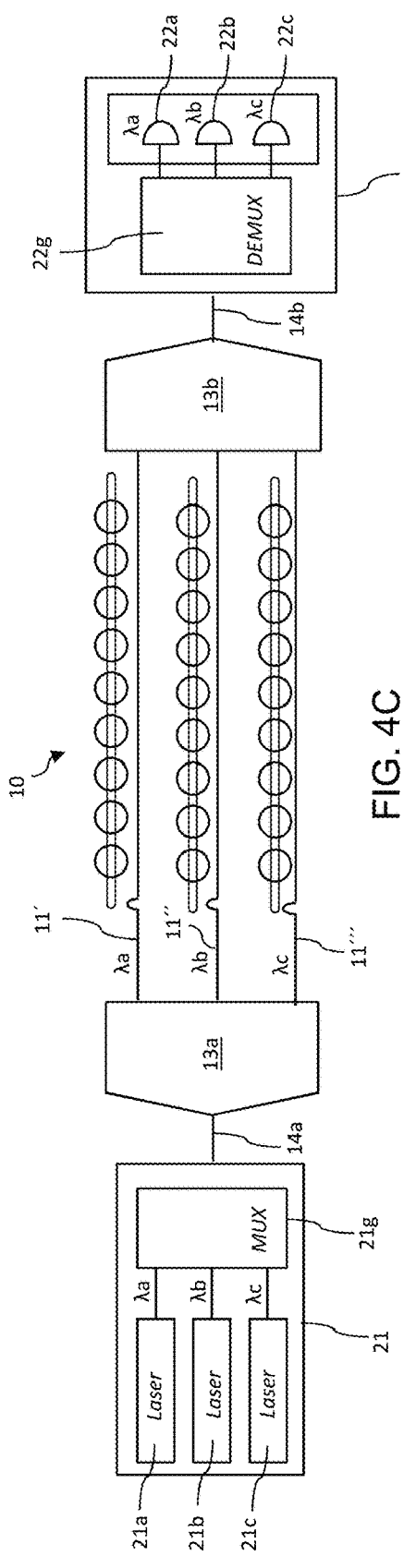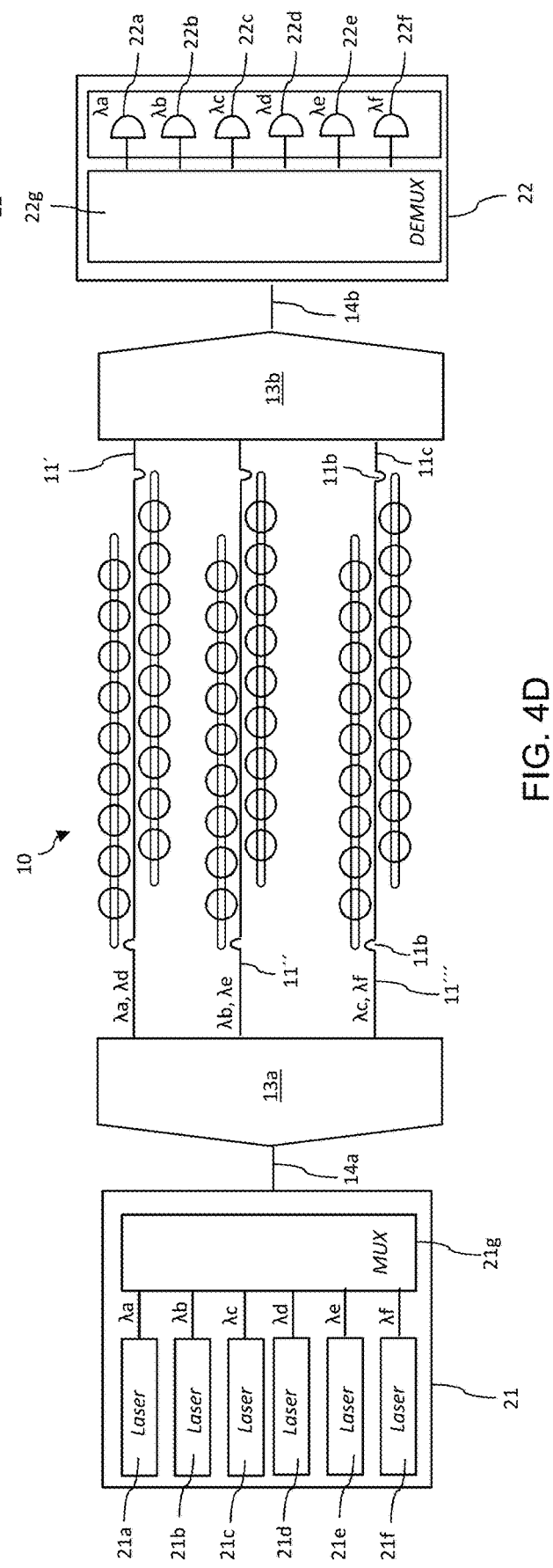
FIG. 4C
FIG. 4D

ACOUSTICAL PRESSURE SENSOR WITH PHOTONIC WAVEGUIDE

CROSS-REFERENCE TO RELATED APPLICATION

The present application is based on priority claimed on European Patent Application No. 19167206.2, filed on Apr. 4, 2019, the contents of which are incorporated herein by reference.

TECHNICAL FIELD

The present invention relates to the field of acoustical pressure sensors. More particularly, it relates to a sensor structure for an acoustical pressure sensor and an opto-mechanical sensor and system that may be used for detecting acoustical pressure waves e.g. in photo-acoustic imaging applications.

BACKGROUND

Photo-acoustic imaging (also called opto-acoustic imaging) is the youngest and the most rapidly advancing modality. This hybrid technology combines rich optical contrast with ultrasonic resolution deep in brain tissue. Photo-acoustic imaging provided new insights in the body's structure, functional activity, and disease by visualization of hemodynamics, oxygenation, metabolism, and molecular targets. To create a photo-acoustic image, pulses of laser light are shone onto brain tissue where the photons are absorbed by tissue and partially converted into heat. The harmless heat-induced expansion emits an ultrasonic pressure wave that is picked up at the skull by ultrasound sensors. Like optical microscopy, chromophores absorb specific optical frequencies distinguishing different types of molecule. Unlike optical microscopy, photo-acoustic imaging depth is not limited by optical diffusion because the propagating ultrasonic waves are much less distorted by tissue. Photo-acoustics ultrasound waves have weak intensity and therefore require high sensitivity (low detection limit). Photo-acoustic imaging, including photo-acoustic tomography, photo-acoustic computed tomography, also referred to as opto-acoustic imaging, opto-acoustic tomography, opto-acoustic computed tomography, etc., some of which is are described in: Wang, L. V. and Yao, J. (2016) 'A practical guide to photoacoustic tomography in the life sciences', Nature Methods, 13(8), pp. 627-638, and Ovsepian, S. V. et al. (2017) 'Pushing the Boundaries of Neuroimaging with Optoacoustics', Neuron 96, pp. 966-988.

In Leinders, S. M. et al, (Scientific Reports 5, 14328, 2015), an optical micromachined ultrasound sensor (OMUS) fabricated with a semi-industrial CMOS fabrication line is disclosed. The OMUS consists of a waveguide and a photonic closed-loop resonator that are integrated onto a membrane. The transmitted spectrum at an output port of the waveguide shows dips at optical resonance wavelengths of the closed-loop resonator. Incident acoustical pressure waves strain the membrane and hence the resonator. The induced strain in the resonator causes a shift in the optical resonance curves with respect to the undeformed state, which shift is observed for detecting the incident acoustical pressure waves.

However, in many medical applications, including catheter-based applications, such as intravascular, laparoscopic, transesophageal echocardiogram, endovaginal, endocavitary applications and freely-moving mouse brain imaging, parallel readout of many opto-mechanical sensors may be complex. Thus, there is a need in the art for improved solutions to further facilitate the use of acoustical pressure sensors (OMUS) in medical applications.

SUMMARY

It is an object to provide a sensor structure for an acoustical pressure sensor, an opto-mechanical sensor and a system for facilitating the use of acoustical pressure sensors in different applications.

As a first aspect of the invention, there is provided a sensor structure for an acoustical pressure sensor, comprising an optical waveguide closed-loop resonator and a plurality of sensor elements, wherein the individual sensor elements of the plurality of sensor elements are configured to be affected by an acoustical pressure wave such that a physical property of the individual sensor element is changed; and wherein the optical waveguide closed-loop resonator is arranged at said plurality of sensor elements and associated with each of the individual sensor elements of the plurality of sensor elements such that a resonance frequency of the optical waveguide closed-loop resonator is shifted due to the affected physical properties of all individual sensor elements of the plurality of sensor elements.

The acoustical pressure sensor may be an ultrasound sensor. Thus, in an embodiment, the sensor structure is configured to detect acoustical sound waves in the frequency range of ultrasound frequencies, such as frequencies above 20 kHz, such as between 1 MHz-50 MHz.

The sensor structure may be useful as an exchangeable structure for use in an acoustical pressure sensor, and thus comprises an optical waveguide closed-loop resonator arranged and associated with a plurality of sensor elements. In the structure, each of the plurality of sensor elements constitutes an individual sensor element.

The optical-waveguide closed-loop resonator may be a photonic waveguide and forms a closed-loop, that may be circular, elongated or any other type of closed-loop form. Furthermore, the optical-waveguide closed-loop resonator may have been formed using integrated optics techniques.

A sensor element of the plurality of sensor elements may comprise a mechanical structure, such as a beam or membrane, that is sensitive to acoustical pressure waves, such as incident or reflected acoustical pressure waves.

A sensor element being affected by changes acoustical pressure waves involves affecting of a physical property of a sensor element, such as the strain or deformation of a mechanical structure of the sensor element, which in turn affects a resonance frequency of the optical waveguide resonator.

An optical waveguide closed-loop resonator is further arranged to be affected by all individual sensor elements of the plurality of sensor elements. Therefore, the optical waveguide closed-loop resonator is arranged at and associated with each of the individual sensor elements of the plurality of sensor elements, meaning that it may e.g. run below, above or through each of the sensor elements. In other words, the resonance frequency of the optical waveguide closed-loop resonator may be affected by actuation of one, several or all individual sensor elements of the plurality of sensor elements.

The sensing of the sensing structure may thus be based on the change in resonance frequency due to a change of the geometry of the optical waveguide closed-loop resonator and/or due to a change in material refractive index. Hence, the shift in resonance frequency may be due to a change in the circumference of the closed-loop resonator and/or due to a change in the waveguide effective refractive index of the closed-loop resonator, which is affected by the deformation of the waveguide cross-section and by the change in the material refractive indices of the waveguide core and cladding. Thus, the sensor elements are configured to be affected by an acoustical pressure wave for causing a change in propagation properties of the optical waveguide closed-loop resonator.

Photonic summing of the affected physical properties of many sensor elements using a single optical waveguide resonator that is associated with all sensor elements, such as running over, under or through the sensor elements, is advantageous in that information of a number of sensor elements are combined, e.g. summing of the signals, to a single carrier of this information, the resonance shift of the closed-loop resonator. Thus, the resonance shift in the optical waveguide closed-loop resonator may be the sum of the contributions of all sensor elements. The closed-loop resonator may in turn be interrogated using a single optical signal and further processed as single signal.

The sensor structure of the first aspect further makes it possible to have a large number of single sensor elements in the structure, such as a high number of single sensor elements each covering a small area. The large number of sensor elements may be addressed using only a single optical waveguide closed-loop resonator, instead of addressing each and every one of the sensor elements with individual waveguides. The sensor structure thus provides for read-out of e.g. an ultrasonic pressure-field over a larger area, but still using small (e.g. circular) membranes as sensor elements, by having a single optical waveguide closed-loop resonator that e.g. runs below, above or through many membranes covering the area of interest.

Moreover, the sensor structure of the first aspect allows for simplified use of a sensor comprising the sensor structure since only on electromagnetic signal may be used for the added signal of all sensor elements. This means that it allows for only one optical channel to be used for a plurality of sensor elements, and thus only one laser and one detector may be used for addressing all sensor elements. Consequently, only one analog-to-digital converter and one reconstruction channel may be used for addressing all sensor elements.

Further, the sensor structure of the first aspect provides a high sensitivity from each sensor element, which is advantageous in e.g. ultrasonic imaging, such as photo-acoustic imaging in which the signals typically are low. Photo-acoustic imaging may e.g. be used for mammography and brain imaging.

It is also advantageous in using many sensor elements distributed over an area compared to using only a single sensor element since the acoustical characteristics of the sensor element may be improved. For example, the acoustical resonance frequency may be improved, the acousto-mechanical performance of a sensor element may be better defined, the number of acoustical resonances close to the used acoustical bandwidth may be reduced. Furthermore, the uniformity of the sensor sensitivity may be improved, the mechanical stability and the acoustic characteristics of the sensor structure may be improved. Having a plurality of sensor elements further allows for placed at any position on e.g. a chip surface such that the sensing area is configured for optimal device performance.

Moreover, the sensor structure provides for acoustical focussing or sensing at an area that may be configured to have a specific sound receive radiation pattern, from multiple elements at specific positions.

In embodiments of the first aspect, the plurality of sensor elements comprises at least 10, such as at least 20, such as at least 30, such as at least 50, such as at least 100, individual sensor elements. The optical waveguide closed-loop resonator may thus be arranged at all those individual sensor elements sensor elements and hence be associated with and affected by each of the individual sensor elements.

In embodiments of the first aspect, each of the individual sensor elements may comprise a flexible portion and the physical property affected due to actuation by acoustical pressure waves may be a deformation of the flexible portion of the sensor element.

The flexible portion may be a membrane, such as a membrane having a round shape. The deformation of the flexible portion may for example be a strain of the flexible portion, which may thereby affect the optical propagation properties, such as geometry and refractive index, of the closed-loop resonator associated with the membrane. The flexible portion may contribute to sensitive sensor elements for example using acoustical resonant structures.

As an example, the closed-loop optical waveguide resonator associated with the individual sensor elements of the plurality of sensor elements may be attached to the flexible portion such that the closed-loop optical waveguide resonator also deforms upon deformation of said flexible portion.

As a further example, a part of the optical closed-loop waveguide associated with the individual sensor element may be partially attached to the flexible portion and partially attached to a fixed portion such that a deformation of the flexible portion affects the propagation of the electro-magnetic wave in said part of the optical closed-loop waveguide.

As an example, the flexible portion may be deformed such that a gap height between the flexible portion and the fixed portion in the optical waveguide closed-loop resonator is changed, thereby affecting the optical propagation properties of the closed-loop resonator.

The waveguides of the waveguide close-loop resonator, including the example with a gap in the waveguide, may provide high opto-mechanical sensitivity contributing to high sensor sensitivity.

In embodiments of the first aspect, the individual sensor elements of the plurality of sensor elements may all comprise membranes having the same properties, e.g. in terms of diameter and thickness. However, it is also possible to use membranes with different diameters, thus different acoustical resonance frequency, to enhance frequency bandwidth of the sensor sensitivity.

Thus, in embodiments of the first aspect, the plurality of sensor elements is configured such that the individual sensor elements are configured to be sensitive to different acoustical resonance frequencies. This may allow for detecting sound more accurately over a larger frequency range.

In embodiments of the first aspect, the plurality of sensor elements is configured with a specific sound receive radiation pattern. The sound receive radiation pattern may be an acoustical focus. The acoustical focus may for example be suitable for ultrasonic imaging or spectroscopy. Thus, the plurality of sensor elements may be configured to have an acoustical focus that may be used for ultrasonic or photo-acoustic imaging. Imaging may also include computed tomography.

However, the sensor elements may also be configured so that the sensor structure in itself does not describe an acoustical focus, but wherein the sound receive radiation pattern still may be used for defining a focus.

In an embodiment of the first aspect, the sensor elements are distributed such that they resemble an acoustic Fresnel zone plate and wherein the sensor elements are only present in the areas which are transparent in the case of a traditional zone plate. This may be a circular or linear Fresnel zone plate for focusing along two or one dimensions, respectively.

In another embodiment of the first aspect, the sensor elements are distributed at an equal-phase contours of an acoustic Fresnel lens. As an example, multiple sensor structures may be used, each addressing an equal-phase contours with specific phase. In the case of two structures, this is referred to as phase zone plate and the contours of phase 0 degrees and phase 180 degrees are used.

As an example, the plurality of sensor elements of the present disclosure may be configured to have an acoustical focus in one or two dimensions.

As an example, the plurality of sensor elements may be arranged such that they extend in a first direction or dimension and may also have a focus in that direction or dimension. Focussing along one direction may be achieved e.g. by having a sensor structure with an elongated sensor area.

The acoustical focus may be used to get information from a specific point in space, such as information used for acoustic imaging, photo-acoustic imaging, acoustic spectroscopy, or photo-acoustic spectroscopy. This may be used to retrieve signal from a position or object of interest with high signal to noise ratio.

As an example, one of the dimensions may be in the direction that is perpendicular to the acoustical image plane.

An individual sensor element may comprise a membrane, and the desired acoustical properties of the plurality of sensor elements may be achieved by designing such membranes in terms of e.g. diameter and/or thickness to the desired acoustical resonance. The arrangement of the individual sensor elements of the plurality of sensor elements may depend on the area the sensor structure is supposed to image or cover. This area may thus be used to determine the acoustical receiving pattern, for example an acoustical focus at a given distance or any other of the previously described configurations.

The distance between the individual sensor elements may be selected to be as small as possible for mechanical stability and cross-talk. The distance between the individual sensor elements may for example be less than half the acoustical wavelength when the sensor structure is to be used for ultrasonic or photo-acoustic imaging.

As an example, the plurality of sensor elements may form an elongated sensor area. The plurality of sensor elements may thus be arranged in a one-dimensional array, or a two-dimensional matrix having an elongated form, such as an a×b array in which a is larger than b.

The sensor area is the projected area of the sensor elements of a sensor structure in the plane in which the sensor elements are arranged.

As an example, the plurality of sensor elements may form an elongated sensor area such that the sensor structure has an acoustical focus in the direction in which the sensor area is elongated. Thus, if the sensor elements are arranged in an array extending in a Y-direction, then the sensor structure may have an acoustical focus in the Y-direction.

A sensor area of the plurality of sensor elements thus refers to the overall area covered by the individual sensing elements, and this overall area may be elongated. Moreover, the optical waveguide closed-loop resonator may have an elongated shape that extends in the same direction as the extension of the elongated sensor area. Thus, if the plurality of sensor elements forms a one-dimensional array, then the closed-loop resonator may extend in the same direction as the one-dimensional array.

Further, the optical waveguide closed-loop resonator may have a small free spectral range, with resonances close together. This may be achieved using a closed-loop resonator having a long circumference. The long circumference may be achieved by using an elongated shape. This shape may extend in the same direction and with similar length as the area covered by the sensor elements of a sensor structure.

As an example, the optical waveguide closed-loop resonator may comprise at least two parallel portions extending along a longitudinal direction of the elongated shape, wherein at least two parallel portions are connected by loops at ends of the parallel portions, wherein the parallel portions are arranged at the plurality of sensor elements.

Thus, the optical waveguide closed-loop resonator may have a racetrack shape constructed by a rectangle with loops at a pair of opposite side of the rectangle, and the plurality of sensor elements may be arranged at the rectangle of the racetrack shape. In examples, only one of the parallel portions is arranged at the plurality of sensor elements. Parallel portions being arranged at the plurality of sensor elements means that the parallel portion or portions runs below, above or through the sensor element.

The term loop should be interpreted as any shape connecting two of the parallel portions. The loop may result in a 180-degree bend of the closed-loop resonator. As an example, the parallel portions of the optical waveguide closed-loop resonator may be spaced the minimum distance apart that is acceptable for optical coupling between the waveguides. Further, the loops may have a shape with a minimal bending radius that is larger than the waveguide spacing while still connecting the parallel portions. Thus, the loop may be formed from two S-Bends to increase the spacing between the waveguides and a 180-degree bend. As a further example, the parallel portions may be connected with each other such that the closed-loop resonator has a spiral shape.

Furthermore, the optical waveguide closed-loop resonator may comprise at least two different portions that are associated with at least one sensor element. Consequently, the closed-loop resonator may be arranged to pass at least two times below, above or through at least one sensor element, such as arranged to pass at least two times below, above or through all sensor elements in the plurality of sensor elements.

If the sensor elements comprise a membrane arranged to be affected by an acoustical pressure wave, then the optical waveguide closed-loop resonator may be part of the membrane, such as embedded in the membrane. As a further example, a first portion of the optical waveguide closed-loop resonator may be embedded in the membrane while a second portion of the optical waveguide closed-loop resonator may be arranged on a fixed substrate.

As a second aspect of the invention there is provided an opto-mechanical sensor for detecting sound pressure waves comprising at least one sensor structure according to the first aspect above; at least one optical waveguide arranged for transmitting an electro-magnetic wave to said at least one sensor structure such that part of the spectrum of the electro-magnetic wave is coupled into said optical waveguide closed-loop resonator of the at least one sensor structure.

The opto-mechanical sensor may be manufactured using integrated optics, photonic integrated circuit and chip technology.

The sound pressure waves may be sound waves in the frequency range of ultrasound frequencies, such as frequencies above 20 kHz, such as between 1 MHz-50 MHz.

This aspect may generally present the same or corresponding advantages as the former aspect. Effects and features of this second aspect are largely analogous to those described above in connection with the first aspect. Embodiments mentioned in relation to the first aspect are largely compatible with the second aspect.

The opto-mechanical sensor may be used as an acoustic pressure sensor but is not limited to detecting ultrasound. Therefore, it may be used to detect acoustic pressure of any kind and generated by any source, such as any type of external ultrasound sources or transducers, including piezo-electric ultrasound sources, micromachined ultrasound sources, capacitive micromachined ultrasound sources, piezo-electric micromachined ultrasound sources, laser induced ultrasound sources. Other sources of acoustic sound that may be detected is photo-acoustic ultrasound generation e.g. in an object of interest and acoustic signal or noise generated by an object of interest itself, e.g. due to Brownian motion, movement or flow.

Applications of the sensor thus include any kind of ultrasonic imaging, photo-acoustic imaging, any kind of ultrasonic spectroscopy, photo-acoustic spectroscopy, etc. and any kind of acoustic imaging or spectroscopy, photo-acoustic imaging or spectroscopy, etc. Applications of the sensor may be in medical imaging, biomedical imaging, non-destructive testing, etc. Thus, the object of study may be human, animal, industrial constructions, pipe, computer chips, etc.

The opto-mechanical sensor may comprise a plurality of sensor structures, such as at least 10, such as at least 50, such as at least 100, such as at least 500 individual sensor structures, such as at least 1000 individual sensor structures.

As an example, the sensor may comprise at least 100 individual sensor structures and at least 10 optical waveguides arranged for transmitting electromagnetic waves to the sensor structures. Thus, an optical waveguide may be arranged for transmitting electromagnetic waves to a plurality of sensor structures of the sensor.

Furthermore, the opto-mechanical sensor may comprise a single optical waveguide or a plurality of optical waveguides, such as an optical waveguide for each sensor structure.

In embodiments of the second aspect, at least optical waveguide comprises an upstream portion for receiving electromagnetic waves that is to be transmitted, at least one coupler for coupling a part of the spectrum of the transmitted electro-magnetic wave into said at least one sensor structure, and a downstream portion for allowing detection means to measure the intensity of the electromagnetic waves that has been transmitted in said optical waveguide.

During use, light may thus be guided into the upstream portion, pass the at least one coupler and then be transmitted into the downstream portion. The downstream portion may be configured to be connectable to detection means so that the intensity of the light in the downstream portion may be measured.

In embodiments of the second aspect, at least two optical waveguides are coupled to one sensor structure. The optical waveguides may form an add-drop filter, and the electro-magnetic waves at either the drop or the pass ports of this filter may be measured during use.

The at least one coupler may for example be at least one directional coupler or at least one Multi-Mode Interference (MMI) coupler.

In embodiments of the second aspect, the sensor comprises a plurality of sensor structures arranged so that the sensor elements of the plurality of sensor structures form a two-dimensional sensor matrix.

The sensor elements of the plurality of sensor structures may thus form a two-dimensional matrix, meaning that all sensor elements of the sensor structures together extend in two directions, i.e. not just a single row of sensor elements.

As an example, the sensor elements of the individual sensor structures may form elongated sensor areas, and the combined sensor area of all individual sensor structures may for a sensor area that is not elongated but e.g. quadratic. If the sensor elements of the individual sensor structures form elongated sensor areas, these structures may give focus in the direction that is perpendicular to the acoustical image plane. Using the recordings of the individual sensor elements of the plurality of sensor elements may be used to compute the acoustic image in the image plane, using e.g. electronic/computational beam-forming.

Acoustical imaging can be achieved in many different ways, as known by a person skilled in the art of acoustical imaging, including acoustical computed tomography, beam-forming, array beamforming, medical imaging, medical ultrasonography, ultrasonic non-destructive testing and evaluation, ultrasonic imaging using transducer arrays, acoustical imaging using one dimensional array sensor technology, acoustical imaging using two-dimensional matrix sensor technology, ultrasonic imaging using two-dimensional matrix sensor technology, piezo-electric ultrasound transducers, capacitive micromachined ultrasonic transducers, piezo-electric micromachined ultrasonic transducers, etc.

However, also developed algorithms such as ultrasound localization microscopy and ultrasound super-resolution, time reversal acoustics, ultrasound plane-wave imaging may be used for imaging.

As an example, the sensor may comprise a plurality of sensor structures having sensor elements forming elongated sensor areas in an X-Y plane such that each of the elongated sensor areas are elongated in the Y direction and have a length in the Y direction that larger than the wavelength of acoustical pressure waves to be detected, and wherein each of the plurality of sensor elements of the plurality of sensor structures has an acoustical focus in a Y direction, thereby allowing imaging in an X-Z plane using recordings of the plurality of sensor structures, wherein the Z-direction is the direction of the normal of the X-Y plane.

Thus, the plurality of sensor elements of the plurality of sensor structures may thus form a plurality of one-dimensional arrays in a Y-direction, each having an acoustical focus in the Y-direction. If the plurality of one-dimensional arrays is arranged in an X-direction parallel to the Y-direction so that all sensor elements of the one-dimensional arrays form a two-dimensional matrix, then the sensor allows for imaging in the Z direction, i.e. the direction that is perpendicular to the X and Y-directions.

In embodiments of the second aspect, the sensor comprises a plurality of sensor structures and wherein a single optical waveguide of the at least one optical waveguide is arranged to couple at least part of the spectrum of the electro-magnetic wave into the optical-waveguide closed-loop resonators of the plurality of sensor structures.

The opto-mechanical sensor may thus comprise a single waveguide arranged for transmitting an electro-magnetic wave to all sensor structures of the sensor, i.e. there may be a single waveguide used for addressing all closed-loop resonators such that a part of the spectra of the transmitted electromagnetic waves is coupled into or interacts with the different closed-loop resonators of the sensor structures. A single waveguide may thus function as a "bus waveguide" for addressing a plurality of sensor structures.

In embodiments of the second aspect, the opto-mechanical sensor comprises a plurality of individual sensor structures, and the closed-loop resonators of the plurality of sensor structures are configured to have different circumference such that their resonances do not overlap.

Thus, the sensor may comprise a plurality of sensor structures with different optical resonance wavelengths, e.g. achieved by different circumferences, all being connected to the same optical waveguide. This allows the sensor structures to be addressed individually using a plurality of electromagnetic waves, each with wavelengths chosen to close to the wavelength of one of the resonances of the resonators of the sensor structures.

In embodiments of the second aspect, the sensor comprises at least two sensor structures and at least two optical waveguides, and wherein the sensor structures and optical waveguides are arranged so that there is one optical waveguide for transmitting an electro-magnetic wave to each sensor structure, and wherein the opto-mechanical sensor further comprises a wavelength division multiplexing (WDM) unit for splitting the bandwidth of electro-magnetic waves transmitted to the opto-mechanical sensor into a plurality of wavelength channels such that each individual sensor structure of the at least two sensor structures may be addressed by one individual wavelength channel. Thus, there may be one optical waveguide per sensor structure.

Many applications (e.g. catheter based: intravascular, laparoscopic, transesophageal echocardiogram, endovaginal, endocavitary, etc; freely-moving animals; hard-to-reach locations) require read-out of a full array or matrix via small lightweight cables. Further, in certain applications it is also undesirable to have electronic connections to the sensor chip (e.g. MRI scanners, places where heat dissipation is a problem such as on skin or brain tissue, explosive environments, environments with electronic noise such as heavy machinery, etc).

Therefore, using a WDM unit together with the sensor makes it possible to multiplex the signals of different sensor structures through a single optical fiber. Thus, this allows interrogation of a plurality of sensor structures via a single optical fiber using a WDM unit, in which the available optical bandwidth is split into wavelength channels and each channel is used to address an individual sensor structure. Using a WDM unit further makes the sensor robust to inevitable fabrication-induced variability in device dimensions, since a WDM unit comprising large WDM channel spacing may be combined with closed-loop resonators having small free-spectral-range, such that there always is a sensor resonance in the WDM channel.

As an example, the WDM unit may comprise a spectral filter having channels with wavelength-bandwidths that are wider than the free-spectral range of the optical waveguide closed-loop resonators of the at least two sensor structures, such that at least one channel contains at least one resonance of an individual optical waveguide closed-loop resonator of the at least two sensor structures.

Thus, the wavelength-bandwidth of the spectral filter may be wider than the free-spectral-range (the distance between resonances) of the closed-loop resonator. The spectral filter could for example be an arrayed waveguide grating (AWG).

The wavelength division multiplexing may also be performed using sensor structures with closed-loop resonators having slightly different resonance frequencies and a single optical waveguide arranged for transmitting an electromagnetic wave to the closed-loop resonators of sensor structures.

Furthermore, the wavelength division multiplexing may also be performed using a few sensor structures, such as less than 100 or less than 10 sensor structures, with closed-loop resonators having slightly different resonance frequencies and similar free-spectral range on one of the WDM unit channels. The total number of closed-loop resonators may be the number of channels of the spectral filter times the number of closed-loop resonators on one waveguide.

As a third aspect of the invention, there is provided an opto-mechanical sensor system comprising an opto-mechanical sensor according to the second aspect above; at least one light source for generating an electro-magnetic wave into the optical waveguide of the opto-mechanical sensor; and at least one photo-detector for detecting an electro-magnetic wave that has been transmitted in the optical waveguide of the opto-mechanical sensor.

This aspect may generally present the same or corresponding advantages as the former aspects. Effects and features of this third aspect are largely analogous to those described above in connection with the first and second aspects.

Embodiments mentioned in relation to the third aspect are largely compatible with the first and second aspects.

The at least one light source may be a laser. The laser may be a tunable laser such that the emission wavelength may be tuned to a fixed wavelength near the resonance peaks of the optical waveguide closed-loop resonators of the sensor structures of the opto-mechanical sensor.

The at least one light source may also be configured to generate broadband light.

The at least one photo-detector is for detecting an electromagnetic wave and may be for measuring the transmitted intensity in the optical waveguide. The at least one photo-detector may be configured to detect transmitted light at a fixed wavelength at a steep edge of the transmission spectrum. The steep edge may originate from the optical resonance in the closed-loop resonators.

The at least one photo-detector may comprise relatively narrow-band spectral filters.

Alternatively, detection may be performed using fast optical spectrometer comprising a plurality of spectral filters As an alternative, an imager may be used to measure the electro-magnetic wave that has been transmitted in the optical waveguide of the opto-mechanical sensor.

Furthermore, broadband light may be transmitted to the at least one detector and the change in resonance wavelengths may be extracted by analysing the transmitted spectrum.

As an example, at least one light source may be configured to emit light of a first wavelength that is tuned to a flank of an optical resonance frequency of the optical waveguide closed-loop resonators of the at least one sensor structure.

Measuring the transmitted light at a fixed wavelength at the flank of the op the optical resonance in the sensor is advantageous in that a shift in the resonance wavelength, due to the shift in resonance frequency of the optical waveguide resonator due to the affected physical properties the sensor elements, directly causes a change in the transmitted intensity. Thus, the sensor becomes very sensitive to shifts in the resonance wavelength.

It is to be understood that the system may comprise electronics, such as amplifiers and filters, as well as digitizers for further processing of a detection signal generated by the at least one photo-detector.

According to another aspect of the present inventive concept, there is provided a method of obtaining data representative of features of an object, said method comprising: subjecting the object to laser radiation such that laser radiation is absorbed and converted into heat within the object; and detecting resultant acoustical pressure wave from said object the using a system according to the third aspect discussed above, wherein the sensor of the system is configured for detecting incident acoustical pressure waves, and thereby obtaining said data.

The method may be an imaging method of the object.

The resultant acoustical pressure wave may originate from heat-induced expansion of the object due to the absorbance of the laser radiation. The object may thus be tissue.

As an example, the opto-mechanical sensor for detecting acoustical pressure waves of the system may comprise a plurality of sensor structures arranged so that the sensor elements of the plurality of sensor structures form a two-dimensional matrix.

The method may further comprise the step of analysing the obtained data representative of features from the object and forming an image of the features. Thus, the method may comprise using reconstruction algorithms to create an image that is related to the optical absorbance of the object.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIGS. 1a-1e are illustrations of embodiments of a sensor structure for an acoustical pressure sensor.

FIGS. 1f and 1g show close-up views of two different variants of bulging portions of a closed-loop resonator.

FIGS. 2a-2d are illustrations of embodiments of an opto-mechanical sensor for detecting acoustical pressure waves.

FIG. 2e shows a close-up view of a waveguide being arranged close to a bulging portion of a closed-loop resonator.

FIGS. 3a-3c are illustrations of further embodiments of an opto-mechanical sensor for detecting acoustical pressure waves.

FIG. 4c is an illustration of a further embodiment of an opto-mechanical sensor system of the present disclosure FIG. 4d is an illustration of a further embodiment of an opto-mechanical sensor system of the present disclosure.

DETAILED DESCRIPTION

Figure 4B:
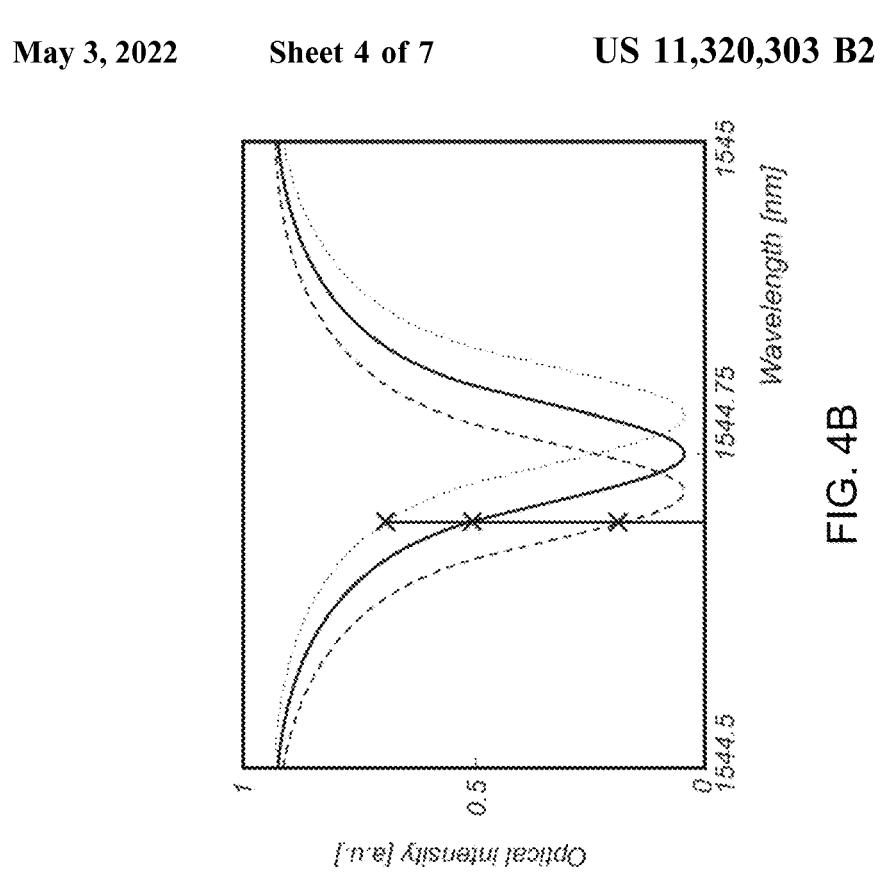
FIG. 4b is a graph of resonance curves for an optical waveguide closed-loop resonator.

FIG. 1a shows an embodiment of a sensor structure 1 for an optomechanical sensor for detecting acoustical pressure waves. The sensor structure 1 comprises an optical waveguide closed-loop resonator 2 and a plurality 3 of individual sensor elements 3a-3e.

The closed-loop resonator 2 is in this example integrated onto the plurality 3 of sensor elements 3a-3e in a photonic chip. The photonic chip could be a silicon or silicon-nitride photonic chip. The sensor elements 3a-3e are in this example small round membranes arranged in a row so that they together form an elongated sensor area 7 in a Y-direction. It should be understood that the membranes may have any other suitable form, such as quadratic or rectangular. An elongated sensor area may have a natural acoustical focus in the imaging plane. The closed-loop resonator is further arranged at the membranes 3a-3e and is associated with each of the individual membranes 3a-3e.

The closed-loop resonator 2 has also an elongated form that extends in the same direction (Y direction) as the row of membranes 3a-3e and the elongated sensor area 7. In this example, the closed-loop resonator has a racetrack shape, comprising two parallel portions 2a, 2b extending along a longitudinal direction of the elongated shape. The two parallel portions 2a, 2b are connected by loops 2c, 2d at ends of the parallel portions. In this example, the parallel portions 2a, 2b are arranged at the plurality 3 of sensor elements 3a-e such that the closed loop resonator is integrated with both parallel portions 2a, 2b in all individual membranes 3a-e of the plurality 3 of membranes.

An incident acoustic pressure wave affects the strain of the membranes 3a-3e and this in turn causes a shift in the resonance frequency of the closed-loop resonator 2 as compared to when the membranes 3a-3e are in an undeformed state. Further, the closed-loop resonator 2 is arranged and associated with all of the membranes 3a-3e such that the resonance frequency of the closed-loop resonator depends on the strain of all sensor elements 3a-3e, i.e. the resonance frequency of the closed-loop resonator 2 depends on the contributions of the deformation of the all the membranes 3a-3e of the plurality 3 of membranes.

In this example, only 5 individual membranes 3a-3e are shown for clarity reasons, but the plurality 3 of membranes may be at least 10 membranes arranged in a row.

FIG. 1b shows an alternative design of a sensor structure 1. This structure 1 is similar as the structure shown in FIG. 1a, comprising an optical waveguide closed-loop resonator 2 and a plurality 3 of individual sensor elements 3a-3e., however, the plurality 3 of membranes 3a-e are arranged in two rows, but still form an elongated sensor area 7. The closed-loop resonator is arranged and integrated in the plurality of membranes such that one of the parallel portions 2a of the racetrack shaped closed-loop resonator 2 is arranged at (integrated in) one of the rows whereas the other parallel portion 2b is arranged at (integrated in) the other row. As an example, the plurality 3 of membranes 3a-e may be two one-dimensional arrays comprising about 10-100 membranes each.

FIG. 1c shows a further alternative deign of a sensor structure 1. In this structure 1, the closed-loop resonator 2 consists of two parallel portions 2a and 2b extending along a longitudinal direction of the elongated shape formed by the plurality 3 of sensor elements. These parallel portions are connected by bulging loops 2c and 2d, which each has a circumference that is substantially longer than the distance between the two parallel portions. The loops 2c and 2d has in this example a round shape such that an imaginary line drawn between two sides of a loop through the centre of the loop is longer than the distance between the two parallel sides 2a and 2b. Having two bulging loops 2c and 2d as illustrated in FIG. 1c allows for arranging the parallel portions of the closed-loop resonator close together, and at the same time providing for a sufficient bend radius needed for the closed loop resonator 2.

FIGS. 1f and 1g show close-up views of variants of a bulging portion 2c of the closed-loop resonator 2. As illustrated in FIG. 1f, the length of an imaginary straight line drawn between two sides through the centre of the bulging portion 2c has a length d2 that is substantially longer than the distance between the two parallel portions 2a and 2b. FIG. 1g shows an example in which the bulging portion 2c also includes a straight part 2c', in this case arranged to be perpendicular to the extension of the parallel portions 2a and 2b. The straight part 2c' may facilitate arranging a connecting waveguide close to the closed loop resonator 2, thereby facilitating coupling of electromagnetic waves into the closed-loop resonator 2.

FIG. 1d shows yet a further embodiment of a sensor structure 1. In this embodiment, the closed-loop resonator 2 runs four times under, above or through each of the sensor elements in the plurality 3 of sensor elements. Thus, the closed-loop resonator 2 comprises in this case four parallel portions 2a, 2a', 2b and 2b' as well as four loops 2c, 2c', 2d and 2d' connecting the parallel portions, thereby forming a single long closed-loop resonator 2.

FIG. 1e shows a further embodiment of a sensor structure 1, in which the closed-loop resonator 2 has a double spiral-shape. The sensor elements 3a-3f are distributed and arranged at the closed-loop resonator 2 such that the sensing area of the sensor structure in this example is not elongated in any direction. Thus, the sensor elements 3a-3f of the singe sensor structure 1 are distributed in both X and Y directions in an X-Y plane such that the sensor area has an acoustical focus in two dimensions.

FIG. 2a shows a schematic illustration of an embodiment of an opto-mechanical sensor 10 for detecting acoustical pressure waves. The sensor 10 comprises in this example a single sensor structure 1 of the kind discussed in relation to FIG. 1a above and a single optical waveguide 11, which is arranged for transmitting an electro-magnetic wave to the sensor structure 1 such that part of the spectrum of the electro-magnetic wave may be coupled into said optical waveguide closed-loop resonator 2 of the sensor structure 1.

When a broad spectrum of light is transmitted into the waveguide 11 via an upstream portion 11a, a part of the spectrum is coupled via the coupler 11b of the waveguide 11 into the closed-loop resonator 2. The coupling portion 11b is thus arranged at the closed loop resonator 2 such that part of the transmitted spectrum may be coupled into the closed-loop resonator 2. The transmitted spectrum at the downstream portion 11c may thus show a dip at the optical resonance wavelengths of the closed loop resonator 2, which may be used as the measurement signal for a detected acoustical pressure wave. Consequently, the transmitted spectrum at the downstream portion depends on the optical resonance frequency of the closed-loop resonator 2. As discussed above, the resonance frequency is in turn is dependent on the strain of all individual sensor elements of the plurality 3 of sensor elements. This is further discussed in relation to FIGS. 4a and 4b below.

The sensor 10 may be fabricated using wafer-scale fabrication technology such as CMOS (complementary metal-oxide-semiconductor) compatible technology, where CMOS compatibility refers to the fabrication technology and is defined in the broad sense, or MEMS (Microelectromechanical systems) technology. The patterning of the waveguide 11 and closed-loop resonator 2 may be done using CMOS compatible fabrication technology. Fabrication of the of the membranes, may be done using CMOS compatible technology including wafer-to-waver bonding, for example related to FIG. 6. Alternatively, fabrication of the membranes may be done using MEMS technology for example as described in Leinders, S. M. et al, (Scientific Reports 5, 14328, 2015).

FIG. 2b shows an alternative design of the sensor 1 for detecting acoustical pressure waves in which the sensor structure illustrated in FIG. 1c is used. The loops 2c and 2d of the elongated closed-loop resonator are is this case longer and forms bulging portions of the resonator 2 having a circumference that is similar or longer than the circumference of a single membrane. This design may facilitate arranging the parallel portions 2a and 2b of the closed-loop resonator close together, and at the same time providing for a sufficient bend radius needed for the closed loop resonator 2.

Unrelated to the shape of the closed-loop resonator 2, FIG. 2b also shows a mirror 12 arranged at the coupler 11b to guide the light back to the upstream 11a and downstream 11b portions of the optical waveguide 11.

FIG. 2e further illustrates how a waveguide may be arranged at a closed-loop resonator having a bulging portion 2c as shown in FIG. 1g. In this case, a waveguide may be arranged with a coupler 11b arranged parallel to (but not touching) the straight part 2c' of the bulging portion 2c of a closed-loop resonator 2.

FIGS. 2c and 2d shows schematic illustrations of embodiments of an opto-mechanical sensor 10 for detecting acoustical pressure waves. The sensor 10 comprises two sensor structures 1' and 1" and a single optical waveguide 11. This waveguide 11 in turn comprises two couplers 11b' and 11b", i.e. one for each sensor structure. In the embodiment shown in FIG. 2c, the sensor structures 1' and 1" are aligned in series and on the same side of the waveguide 11, thereby forming elongated sensor areas arranged with their shorter sides next to each other, whereas in the embodiment shown in FIG. 2d, the sensor structures 1' and 1" are arranged on different sides of the waveguide 11, which may form a more compact overall structure. The embodiments illustrated in FIGS. 2c and 2d are thus examples on how multiple sensor structures 1', 1" may be coupled to the same waveguide 11, which thus functions as a bus waveguide. Exact placement of the sensor structures along the waveguide may depend on the desired acoustical characteristics, such as a desired radiation pattern.

In the embodiments shown in FIGS. 2c and 2d, the closed loop resonator of sensor structure 1' may have slightly different resonance frequency than the closed loop resonator of sensor structure 1", so that different wavelengths of the electromagnetic waves propagating in waveguide 11 is coupled into the different sensor structures 1' and 1". As an example, the circumference of the closed-loop resonators of the sensor structure 1' and 1" may be slightly different such that the resonances do not overlap. Thus, the number and design of the closed loop-resonators of the sensor structures may be chosen such that the resonances do not overlap for given fabrication variability The embodiments shown in FIGS. 2c and 2d thus allows for wavelength division multiplexing of the electromagnetic waves, using one bus waveguide 11 for guiding the electromagnetic waves to both sensor structures 1' and 1".

FIG. 3a shows an embodiment of a sensor 10 for detecting acoustical pressure waves, in which the sensor 10 comprises a plurality of sensor structures 1 arranged so that the sensor elements of the plurality 3 of sensor structures 1 form a two-dimensional sensor matrix 7a. Thus, the plurality 3 membranes (sensor elements) of a single sensor structure 1 form an elongated sensor area 7, so that the two-dimensional matrix 7a comprises a plurality of elongated sensor areas 7. It should be understood that the sensor elements of the sensor structures do not need to form aligned rows and columns of sensor elements in the two-dimensional matrix, but may e.g. form a matrix with a plurality of rows in which the sensor elements are shifted in relation to the sensor elements in an adjacent row.

The sensor 10 further comprises a plurality of optical waveguides 11 for coupling a part of the spectrum of the transmitted electro-magnetic waves into the plurality of sensor structures 1. In this example there is one optical waveguide 11 per sensor structure 1.

As alternative to the mirror 12, with the objective to feed the optical signal with sensor information back into waveguides 11, the waveguides 11 may comprise an additional coupler that splits waveguide 11 in two, and each of these two waveguides is coupled to the waveguide closed-loop resonator 2. In this case, light is transmitted both clockwise and anti-clockwise through the closed-loop resonator 2, and also coupled back into the two parts of split waveguide 11, and at the aforementioned coupler combined back into single waveguide 11.

The sensor 10 further comprises a wavelength division multiplexing (WDM) unit 13 for splitting the optical bandwidth of an electro-magnetic wave transmitted to the WDM unit via optical fiber or waveguide 14a into a plurality of wavelength channels. In this example, each individual sensor structure 1 is addressed by one individual wavelength channel.

The WDM unit 13 may be or comprise an arrayed waveguide grating, a concave grating, a Mach-Zehnder interference filter, ring filters or concaternated/coupled ring filters. See for example Bogaerts, W. et al. (2010) 'Silicon-on-insulator spectral filters fabricated with CMOS technology', IEEE Journal on Selected Topics in Quantum Electronics, 16(1), pp. 33-44, for suitable WDM units.

Figure 3D:
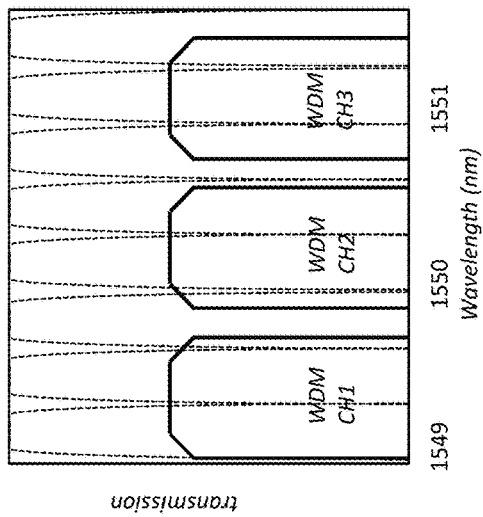
FIG. 3d illustrates wavelength division multiplexing (WDM) that may be used with the sensor of the present disclosure.

Thus, the WDM unit 13 may be arranged for receiving electromagnetic waves through the optical fiber 14a and for dividing the bandwidth of the electromagnetic waves into several channels, one for each sensor structure. This is schematically illustrated in FIG. 3d, which shows the transmission as a function of wavelength and three wavelength channels, in which the dashed lines show an example transmission spectrum of a closed-loop optical resonator, and three solid curves show transmission of three channels of the WDM unit (indicated WDM CH1, WDM CH2, WDM CH3).

In the embodiment shown in FIG. 3a, the sensor further comprises mirrors 12 at each sensor structure 1. These mirrors 12 are arranged for guiding the transmitted electro-magnetic waves back to the WDM unit 13. Thus, the WDM unit 13 illustrated in FIG. 3a may further comprise a demultiplexing unit for extracting the multiplexed channels.

This is advantageous in that only a single optical fiber 14a may be used instead of e.g. two optical fibers. This means that only one unit defines the spectral wavelength channels and may thus decrease risks associated with having several units, such as differences due to undesired fabrication variability. As an example, the WDM unit 13 may comprise a spectral filter having channels with wavelength-bandwidths that are wider than the free-spectral range of the optical waveguide closed-loop resonators 2 of the plurality of sensor structures 1. Further, the spectral filter may be configured such that at least one channel contains at least one resonance of an individual optical waveguide closed-loop resonator 2 of the plurality of sensor structures 1.

The plurality of closed-loop resonators 2 of the plurality of sensor structures 1 may have similar free-spectral-range, and the plurality of closed-loop resonators 2 can be connected to one channel of the spectral MUX/DEMUX filter. With the channel width of the spectral filter wider than the free-spectral-range of the closed-loop resonator set, there may be no need for wavelength alignment between the filter and the plurality of closed-loop resonators 2.

FIG. 3b shows an alternative design of the opto-mechanical sensor 1 discussed in relation of FIG. 3a above. In this embodiment, the WDM unit 13 comprises a separate demultiplexing unit 13a arranged for receiving electromagnetic waves through a first optical fiber 14a and for dividing the bandwidth of the electromagnetic waves into several channels, one for each sensor structure 1. Unit 13a could also be a splitter configured to split the electromagnetic waves and feed all optical signals to all channels.

There is further one waveguide 11 associated with each sensor structure, and the split electromagnetic waves are guided into the upstream portions 11a of the waveguides 11. The WDM unit further comprises a separate multiplexing unit 13b arranged for receiving the electromagnetic waves guided through the downstream portion 11c and for combining the electromagnetic waves from the different waveguides 11 such that they may be sent through a second optical fiber 14b. The sensor design of FIG. 3b may result in cleaner optical signal with less disturbance due to e.g. optical reflections in waveguide 14a or elsewhere.

FIG. 3c shows a further embodiment of the opto-mechanical sensor 10. The sensor 10 is similar to the sensor discussed in relation to FIG. 3b above, but each waveguide 11 of the plurality of waveguides is used to couple light into the closed-loop resonator of a plurality of sensor structures 1. As seen in FIG. 3c, each waveguide 11', 11" and 11'" is used to couple light into two different sensor structures 1. Thus, these waveguides function as bus waveguides for the closed-loop resonators 2 of the sensor structures 1, and a single multiplexing unit 13a, such as a spectral filter, is used for multiplexing incoming electromagnetic waves from optical fibre 14a to the bus waveguides 11', 11" and 11'".

Figure 4A:
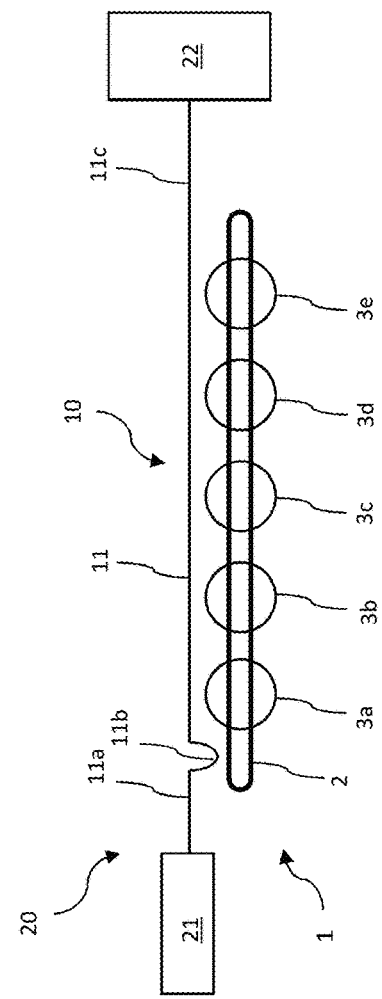
FIG. 4a is an illustration of an embodiment of an opto-mechanical sensor system of the present disclosure.

FIG. 4a illustrates on how the sensor 10 of FIG. 2a may be used in an opto-mechanical sensor system 20 for detecting acoustical waves. The system 20 comprises apart from the sensor 10a laser source 21 for generating the electromagnetic wave that is to be guided by the waveguide 11. It should be realized that it is not necessary to use a laser source 21. Rather, a light source 21 which may provide a relatively narrow band of generated light may be used. For instance, a light-emitting diode (LED) may be used instead, possibly in combination with a spectral filter for forming a narrow band of generated light. Although it is in the following referred mainly to laser light, it should thus be understood that it may alternatively be another type of narrow band light.

Thus, laser light from the laser source 21 may be coupled into the upstream portion 11a of waveguide 11 and be guided by the waveguide 11 past the optical waveguide closed-loop resonator 2, and part of the laser light may be coupled into the closed-loop resonator 2. Consequently, an intensity of the laser light propagating past the optical waveguide closed-loop resonator 2 will depend on the correspondence between the wavelength of the laser light and the resonance wavelength of the optical waveguide closed-loop resonator 2. Since the resonance wavelength of the electro-magnetic resonator 210 will be dependent on the deformation of all individual membranes of the plurality of sensor elements 3a-e, the intensity of the laser light in the waveguide 11 may provide a measure of the external force received by the membranes of the plurality of sensor elements 3a-e.

The system 20 further comprise a detector 22, which may be configured to receive the electro-magnetic wave having propagated past the optical waveguide closed-loop resonator 2 in the waveguide 11. The detector 22 may thus be in the form of one or several photo-detectors for detecting an electro-magnetic wave that has been transmitted in the waveguide 11, such as configured for detecting the intensity of the electro-magnetic wave. The detector 22 may be a photo diode, an imager or other type of optical detector.

Hence, the electro-magnetic wave in the waveguide 11 may be coupled out of the waveguide 11 at the downstream portion 11c and received by the detector 22.

The laser source 21 and the detector 22 may or may not be formed on a common sensor chip with the sensor 10.

The detection mechanism of the sensor element 1 in the system 20 of FIG. 4a is further discussed in relation to FIG. 4b. The laser source 21 may be configured to generate laser light of a wavelength being arranged at a flank of a resonance curve of the optical waveguide closed-loop resonator 2. Thus, the laser source 21 may provide a measurement wavelength, which does not correspond exactly to the resonance wavelength of the electro-magnetic resonator 2 in an undeformed state of the membranes of the plurality of sensor elements 3a-e.

In the graph of FIG. 4b, the intensity that would be measured by the detector 22 for different wavelengths of the laser light are illustrated. Three different resonance curves are illustrated for different resonance wavelength of the optical waveguide closed-loop resonator 2. The resonance wavelength (and corresponding dip in intensity) is shifted in dependence of e.g. a change of the geometry of the closed-loop resonator and/or due to a change in material refractive indices Measurements are performed at a wavelength indicated by a straight line in the graph of FIG. 4b and the transmission of the light at this wavelength is indicated by crosses and illustrates that, depending on the change in geometry and/or material refractive index of the closed-loop resonator 2, the transmission will change.

Figure 4E:
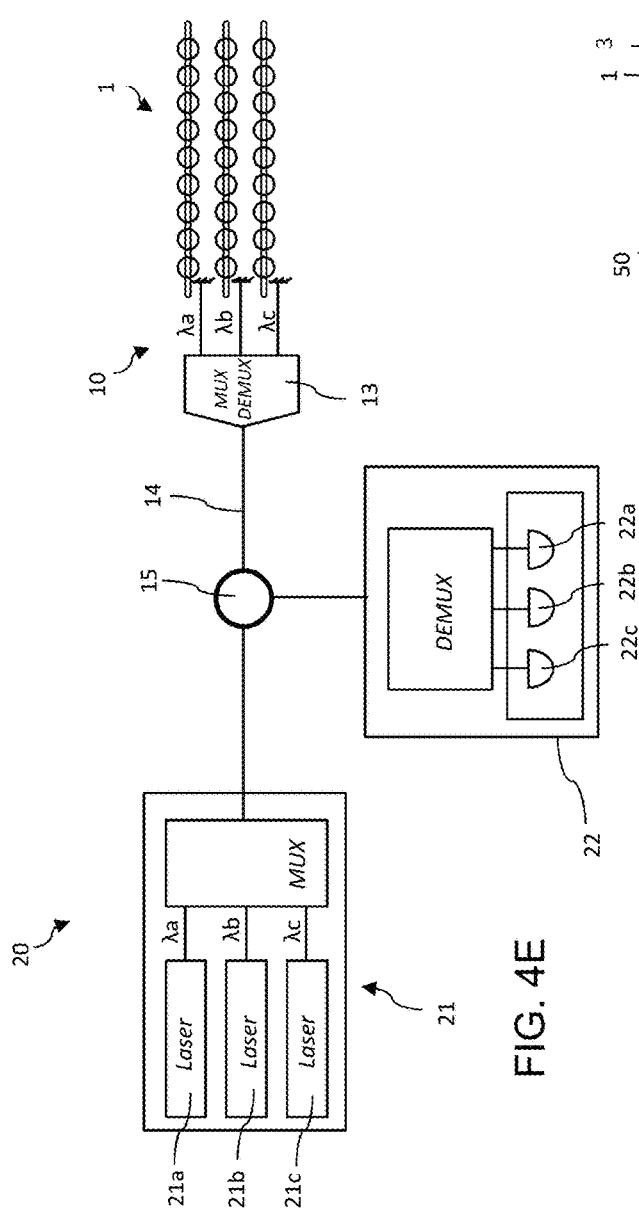
FIG. 4e is an illustration of a further embodiment of an opto-mechanical sensor system of the present disclosure

The center resonance curve (solid line) illustrates the resonance wavelength of the optical waveguide closed-loop resonator 2 in the undeformed state of the of the membranes of the plurality of sensor elements 3a-e. Since the measurement wavelength is selected to be arranged at a flank of the resonance curve, small changes in resonance frequency (illustrated by the dashed line resonance curve) due to acoustical pressure waves deforming the membranes of the plurality of sensor elements 3a-e will be detected by the detector 22 as changes in optical intensity. Thus, a shift of the resonance curve directly translates into a modulation of the transmitted optical intensity, which is hence used for detecting the acoustical pressure wave FIGS. 4c-e illustrate further embodiments of opto-mechanical sensor systems 20 for detecting acoustical waves. In these embodiments, the sensors 10 comprises a plurality of sensor structures and a plurality of waveguides arranged for transmitting an electro-magnetic wave to the plurality of sensor structures.

In the system 20 of illustrated in FIG. 4c, the opto-mechanical sensor 10 for detecting acoustical pressure waves is connected to a light source 21 comprising a first laser 21a configured for emitting light of a first wavelength λa, a second laser 21b configured for emitting light of a second wavelength λb and a third laser 21c configured for emitting light of a third wavelength Inc. The emitted light is multiplexed by multiplexing unit 21g and guided in a single optical fiber 14a to the multiplexing unit 13a of the sensor 1. With the wavelength division multiplexing performed by multiplexing unit 13a, the light is split into three different channels such that wavelength λa is guided in a first waveguide 11' of the sensor 10, wavelength λb is guided in a second waveguide 11'' of the sensor 10 and wavelength λc is guided in a third waveguide 11''' of the sensor 10. In this way the different wavelengths of the lasers 21a-c are guided to the different sensor structures of the sensor 10. In the embodiments shown in FIG. 4c, the sensor 10 comprises one waveguide 11 per sensor structure. A demultiplexing unit 13b is then used to combine the electromagnetic waves that have been guided through the first, second and third waveguides so that they may sent through a single optical fiber 14b to a photo-detector 22. Thus, the multiplexing unit 13a and the demultiplexing unit 13b together for the WDM unit 13 of the sensor 10.

The photo-detector 22 in turn comprises a demultiplexing unit 22g, so that the different wavelengths λa, λb and λc may be detected using three separate photo-diodes 22a, 22b and 22c.

The embodiment illustrated in FIG. 4d is similar to the embodiment described in relation to FIG. 4c above. The difference is that the sensor 10 comprises more than one sensor structure per waveguide 11 (in FIG. 4d illustrated as two sensor structures per waveguide). Further, the light source 21 is configured to emit six different wavelengths (λa-λf) sent via a single optical fiber 14a to multiplexing unit 13a, which splits the electromagnetic wave such that two of the wavelengths of the emitted wavelengths are guided in each waveguide 11. Thus, waveguide 11' is arranged for transmitting an electro-magnetic wave of wavelength λa and λd to a first plurality of sensor structures, waveguide 11'' is arranged for transmitting an electro-magnetic wave of wavelength λb and λe to a second plurality of sensor structures and waveguide 11''' is arranged for transmitting an electro-magnetic wave of wavelength λc and Δf to a third plurality of sensor structures. This also means that the waveguides 11', 11'', and 11''' comprises a plurality of couplers 11b, i.e. one for each sensor structure, so that the different wavelengths may be coupled into different closed-loop resonators. In analogy, the detector 22 comprises six different photo-diodes 22a-f, so that the intensity of the different wavelengths may be detected by separate photodiodes.

The embodiment illustrated in FIG. 4e is similar to the embodiment described in relation to FIG. 4c above. However, in this embodiment the sensor 1 comprises a WDM unit 13 with a combined multiplexing and demultiplexing unit, so that the light guided to the plurality of sensor structures via WDM unit 13 are mirrored back to the WDM unit 13 and then sent back using the same optical fiber 14 in which the light has been transmitted to the sensor 10. Thus, the same optical fiber 14 is used for guiding light both to and from the sensor 14. In addition, the system 20 comprises a circulator 15 so that the light being transmitted back in fiber 14 may be guided to the detector 22.

Sensor systems of the present disclosure, such as the sensor systems discussed in relation to FIGS. 4a-e above, may be arranged together so as to form a single sensing unit comprising several sensing systems. All sensors of such a unit may be on the same photonic chip with optical fibres connected to it.

In the embodiments described in relation to FIGS. 4c-e above, the membranes of the sensor structures 1 may be configured with center frequency 15 MHz. This frequency is typical for high-resolution ultrasonic and photo-acoustic imaging of tissue. To get a natural focus, about 128 one dimensional arrays of membranes may be used. Each array or sensor structure may comprise ~30 membranes and may have a length of ~1 mm. Thus, the sensors 10 may be arranged such that each sensor structure 1 comprises a single one-dimensional array.

Further, the sensor structures of the ultrasound sensors 10 may thus measure average pressure over a length of ~1 mm and the silicon photonic multiplexing used with the WDM unit 13 may further be agnostic to absolute wavelength.

The multiplexing concept discussed in relation to FIGS. 4c-e may be used with elongated and long closed-loop resonators 2 (circumference may be ~2 mm) with small free-spectral-range (FSR~0.3 nm) in combination with a spectral filter, e.g. arrayed waveguide grating (AWG), that has channels with wavelength-bandwidths (~0.8-3.2 nm or 100-400 GHz) much wider than the resonator FSR (as shown in FIG. 3d). This design is agnostic to initial wavelength of the resonances as there will always be one resonance in each filter channel. The lasers of the light source 21 may be tuned slowly (<10 Hz) to the resonances of the closed-loop resonators 2.

Figure 5:
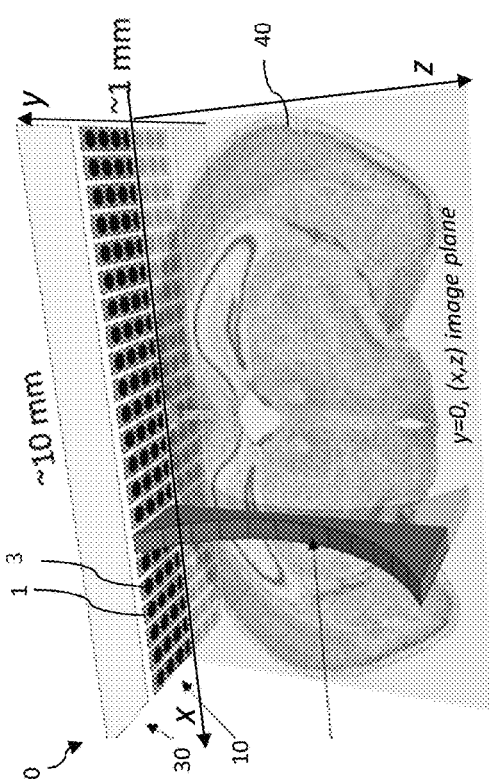
FIG. 5 is an illustration of how an opto-mechanical sensor system of the present disclosure may be used for photo-acoustic imaging.

Further, the sensor structures with the membranes arranged to form elongated sensor areas as discussed above have a natural acoustical focus as used in ultrasonic or photo-acoustic 1-D array imaging. FIG. 5 schematically illustrates how the opto-mechanical sensor system 20 as shown in FIGS. 4c-e may be used in an ultrasonic or photo-acoustic imaging apparatus 50. This apparatus 50 comprises a source 30 for pulsed laser light that may be shone into e.g. brain tissue 40. The pulsed laser is absorbed by the tissue 40 and partially converted into heat. The heat-induced expansion of the tissue emits an ultrasonic pressure wave which is detected by the sensor 10, which comprises sensor structures of one-dimensional arrays extending in the Y-direction and arranged so that all sensor elements form a two-dimensional matrix in the XY plane.

A single sensing element (membrane) of the sensor 10 has no acoustical focus if the diameter is close to zero. However, for a plurality of sensing elements forming an elongated sensor area, such as a one-dimensional array of sensor elements, has an acoustical focus in the Y direction. In order to allow for acoustical imaging, e.g. by digital reconstruction based on recordings of a plurality of the sensor structures, the one-dimensional arrays are therefore arranged next to each other in the XY plane (in the z=0 plane). The XZ-plane is thus the imaging plane and using recordings of all sensors, an image corresponding to features in the XZ-plane may be constructed.

Below follows some more detailed specifications of the different components that may be used in the sensor element, sensor and sensor system as discussed above. The below detailed specifications should be seen as non-limiting examples. The wavelengths emitted by the light source may be near infrared telecommunication wavelengths, e.g. around 850 nm, 1300 nm, or 1550 nm, visible wavelengths or infrared wavelengths (700 nm to 20 micrometer). Further, waveguides used as closed loop resonators or waveguides for transmitting light to be coupled into the closed-loop resonators may have core material of silicon for infrared light, silicon-nitride for infrared or visible light. Many other materials possible, e.g., titanium oxide, germanium, indium-gallium-arsenide, gallium-arsenide, indium-phosphide, aluminum-gallium-arsenide, and lithium-niobate may be used. The waveguide core may also consist of multiple parts. As a cladding material, e.g. silicon-dioxide or air but also other material, e.g. SiN or SiC in case of silicon waveguide core.

Further, dimensions of a waveguide may be: height below 500 nm, width below 10 micrometers (e.g. for silicon or silicon-nitride waveguide core with silicon-dioxide and/or air cladding).

A membrane used as sensing element may be of cladding material (e.g. silicon-dioxide) and can also include waveguide core material (waveguide through membrane/waveguide part of membrane). Thickness of membrane may be 0-10 micrometer with a membrane diameter of 0-100 micrometers. As an example, membrane thickness may be about 2 micrometer with membrane diameter of 0-100 micrometers. As a further example, membrane material mainly be silicon-dioxide, thickness 2 µm, dimensions 15 µm-60 µm, for to achieve acoustical resonance frequencies between 2 MHz and 40 MHz.

The length of sensor structures may be designed for desired acoustical focus distance, e.g. designed using the equation $N=D*D/(4*\lambda)$, with N the focus distance, D the length in the Y-direction of the elongated structure, $\lambda$ the wavelength of the sound in the material of interest (e.g. water, blood, tissue). As an example, the ultrasound frequency and focus distance may be chosen for the specific application, e.g. a focus distance of 4 mm, 7 mm, or 10 mm for sound of 15 MHz, 10 MHz and 5 MHz, respectively.

Below follows a detailed specification of a sensor comprising a linear ultrasound array with 128 elements, 15 MHz ultrasound, 4 mm focus distance, for (bio)-medical imaging. The sensor structures of the sensor may be configured for electromagnetic waves with wavelength of about 1550 nm. The closed loop resonators of the sensor may be of two parts, one fixed to substrate and one to membrane with silicon waveguide core, silicon-dioxide top and bottom cladding and air side cladding. Membranes may then be 2 um silicon-dioxide layer and 70 nm silicon layer with diameter 25 micrometer. Elongated sensor areas may be formed using membranes next to each other over a length of 1.2 mm in the Y-direction and the resonator free-spectral-range may be ~0.22 nm (or ~27 GHz).

The sensor may further comprise 128 sensor structures next to each other in an x-direction (perpendicular to the Y direction) with a pitch of 50 micrometer (half acoustical wavelength in water). 8 optical fibers (4 input, 4 output) for the full sensor, 32 sensor structures addressed through one optical fiber using wavelength division multiplexing. Spectral filter, e.g., arrayed waveguide grating, for wavelength division multiplexing. 32 channels per spectral filter, channel width ~100 GHz or ~200 GHz (typical telecom).

A system may for example further comprise 128 lasers, each tuned to the flank of a resonance, 4 multiplexing units with 32 channels each to combine 32 laser outputs into 1 optical fiber, 4 optical fibers (or a fiber bundle, or a multicore fiber) used for input of light to a chip as well as 4 on-chip demultiplexers with 32 channels per multiplexer. Such a system may further comprise sensor structures, 4 on-chip multiplexers with 32 channels per multiplexer, 4 optical fibers, 4 demultiplexers, 128 photo-detectors, 128 digitizers and a PC and ultrasound imaging algorithm.

The system and chip can also have the configuration including an on-chip mirror, in that case the system may include a circulator.

Figure 6A:
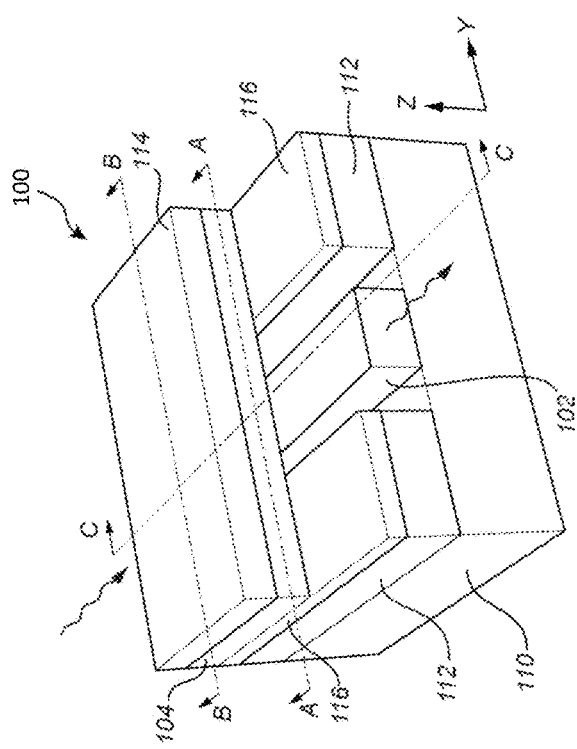
FIGS. 6a and 6b are illustrations of an opto-mechanical sensor waveguide that may be used in a sensor structure of the present disclosure.
Figure 6B:
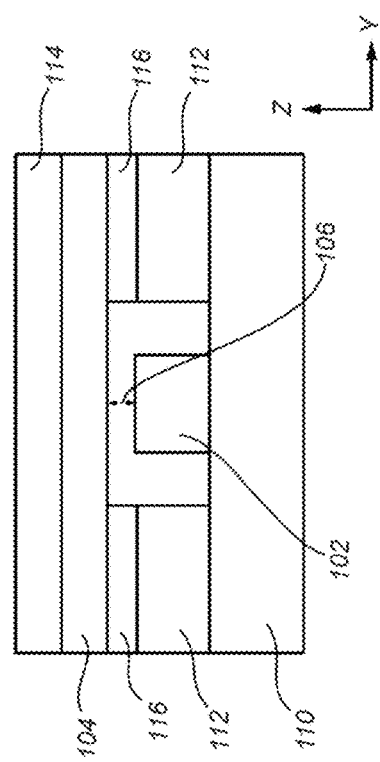

Referring now to FIGS. 6a and 6b, a specific example of a waveguide 100 for guiding an electro-magnetic wave that may be implemented in the sensor structure 1 of the present disclosure will be described in more detail.

The waveguide 100 is schematically illustrated in FIG. 6a in a perspective view, wherein top layers have been partly removed in order to better show underlying layers. FIG. 6b shows a cross-section of the waveguide 100 taken along lines A-A in FIG. 1.

The waveguide 100 comprises a first waveguide part 102 and a second waveguide part 104. The waveguide 100 may be formed on a substrate 110 with the first and the second waveguide parts 102, 104 being arranged in different layers on the substrate 110, so as to extend in a first plane and a second plane, respectively.

The waveguide 100 is illustrated in FIG. 6a with the first waveguide part 102 being arranged on the substrate 110 and the second waveguide part 104 being arranged above the first waveguide part 102. It should be realized that the waveguide parts 102, 104 may instead be arranged in an inverted relationship, with the second waveguide part 104 being arranged on the substrate 110 and the first waveguide part 102 being arranged above the second waveguide part 104.

The first waveguide part 102 may be patterned in the first plane so as to define a track along which an electro-magnetic wave will be propagated in the waveguide 100. The first waveguide part 102 may be arranged in a trench or cavity formed on the substrate 110 such that the first waveguide part 102 is spaced in a lateral direction in the first plane from walls defining the trench or cavity. These walls may be formed from the same material as the first waveguide part 102, which may simplify manufacture of the waveguide 100, but the walls will not contribute to guiding of an electro-magnetic wave. The walls may function as a support for the second waveguide part 104 or a structure on which the second waveguide part 104 is formed and will therefore in the following be referred to as supporting structures 112.

The first waveguide part 102 has a first width in the first plane in a first direction Y perpendicular to the direction of propagation of the electro-magnetic wave in the waveguide 100. The width of the first waveguide part 102 may confine the electro-magnetic wave in a direction perpendicular to the direction of propagation of the electro-magnetic wave in order for the electro-magnetic wave to be guided along the track defined by the first waveguide part 102.

The first waveguide part 102 and the second waveguide part 104 may be spaced apart by a gap 106 extending in a second direction Z perpendicular to the first and the second planes. The gap 106 may have a size which is sufficiently small such that the first and second waveguide parts 102, 104 unitely form a single waveguide 100 for guiding the electro-magnetic wave. This implies that the first and second waveguide parts 102, 104 are configured to be so close to each other that an electro-magnetic wave propagating through the waveguide will be jointly propagated by the first and second waveguide parts.

Propagation properties of the waveguide 100 may be largely affected by properties of the gap 106. This may or may not be due to an electro-magnetic field intensity of a waveguide mode being high at a position of the gap 106.

Thus, if the size of the gap 106 is changed, an influence on propagation of the electro-magnetic wave in the waveguide 100 is provided. This may be used for sensing of an acoustical pressure wave causing a change in the size of the gap 106 as will be described in further detail below. The gap 106 may be designed to be within a range of 10-100 nm.

Referring again to FIGS. 6a and 6b, the second waveguide part 104 or a structure on which the second waveguide part 104 is formed may be supported by the supporting structures 112. The supporting structures 112 may define a height in the second direction Z which is larger than a height (thickness) of the first waveguide part. Thus, by the second waveguide part 104 being supported by the supporting structures 112, the second waveguide part 104 will be arranged spaced apart from the first waveguide part 102 by the gap 106.

The second waveguide part 104 has a second width in the first direction Y, which is larger than the first width. The second waveguide part 104 may be configured to have a large extension in the second plane. In an embodiment, the second waveguide part 104 may be formed as a slab waveguide part, i.e. in relation to a thickness of the second waveguide part 104, propagation of the electro-magnetic wave in the second waveguide part 104 may be modeled by the second waveguide part 104 having an infinite extension in the second plane.

The second waveguide part 104 may be configured as a large rectangular sheet, which may cover the first waveguide part 102. Hence, the second waveguide part 104 may not need to be patterned to follow the track defined by the first waveguide part 102. Rather, a projection of the track of the first waveguide part onto the second plane may fit within the rectangular sheet forming the second waveguide part 104.

This may imply that the waveguide 100 defined unitely by the first and the second waveguide part 102, 104 may guide an electro-magnetic wave along the track which is only patterned in the first waveguide part 102. Hence, the first waveguide part 102 may control the track along which the electro-magnetic wave is propagated. Still, the first and the second waveguide parts 102, 104 will jointly guide the electro-magnetic wave, as a fraction of the wave will be propagated in each of the first and the second waveguide parts 102, 104.

According to an embodiment, the second waveguide part 104 has a second width which is slightly larger than the first width. Thus, the second waveguide part 104 may not be vastly wider than the first waveguide part 102. The second waveguide part 104 being wider than the first waveguide part 102 still ensures that a relation between the first and the second waveguide parts 102, 104 in the first direction Y may not significantly affect propagation properties of the waveguide 100. Rather, a displacement of the first waveguide part 102 from a nominal position may not affect propagation properties of the waveguide 100, since a projection of the first width of the first waveguide part 102 onto the second plane may still be arranged on a portion of the second waveguide part 104. This implies that there is not a stringent requirement of aligning the first and second waveguide parts 102, 104 during manufacturing of the waveguide 100. Hence, the waveguide 100 may be manufactured with relatively large tolerances in the first direction Y, which may simplify manufacture and/or increase yield in manufacturing of the waveguide 100.

In an embodiment, the second width may be at least two times the first width. This may ensure that very large tolerances in the placement of the first waveguide part 102 in the first direction Y may be used in manufacturing. However, the second waveguide part 104 may need to be at least partly patterned to follow the track defined by the first waveguide part 102 and may not be simply formed as a rectangular sheet.

The gap 106 as well as the lateral spacing between the first waveguide part 102 and the supporting structures 112 may be filled by a gaseous medium, such as air, or a liquid medium, which may be arranged in a confined space of the waveguide 100. The first waveguide part 102 may thus be surrounded by a medium, which is suitable for promoting propagation of an electro-magnetic wave in the waveguide 100.

As an alternative, the first waveguide part 102 may be surrounded by a cladding material on lateral sides of the first waveguide part 102 in the first plane. Thus, the lateral spacing between the first waveguide part 102 and the supporting structures 112 may be filled by the cladding material, or the first waveguide part 102 may be formed in a trench within the cladding material.

A layer of cladding material on the substrate 110 may be arranged below the first waveguide part 102 in order to promote propagation of the electro-magnetic wave in the waveguide 100. Alternatively, an insulator layer of the substrate 110 may function as a cladding material, e.g. if the substrate 110 is a silicon-on-insulator substrate 110 on which the waveguide 100 is formed. In the figures, only an insulator layer of the substrate 110 is illustrated.

The waveguide 100 may further comprise a layer 114 of cladding material above the second waveguide part 104 in order to promote propagation of the electro-magnetic wave in the waveguide 100.

The layer 114 of cladding material may also function to isolate the waveguide 100 from an influence of a medium above the waveguide 100. This may be important e.g. if the waveguide is to be used for sensing in a liquid, such as for ultrasound sensing in water.

An interface of the second waveguide part 104 facing the substrate 110 may be surrounded by the medium filling the gap 106 and the lateral spacing between the first waveguide part 102 and the supporting structures 112.

Further, a top layer 116 of the supporting structures 112 may be formed by a cladding material. This may be suitable as the gap 106 may in portions of the waveguide 100 be filled by the same material as in the top layer 116, which may then be a suitable material to be used within the gap 106 of the waveguide 100.

Figure 7A:
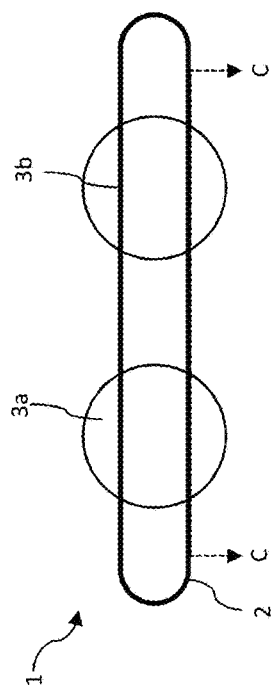
FIGS. 7a and 7b are further illustrations on how an opto-mechanical sensor waveguide may be used in a sensor structure of the present disclosure.
Figure 7B:
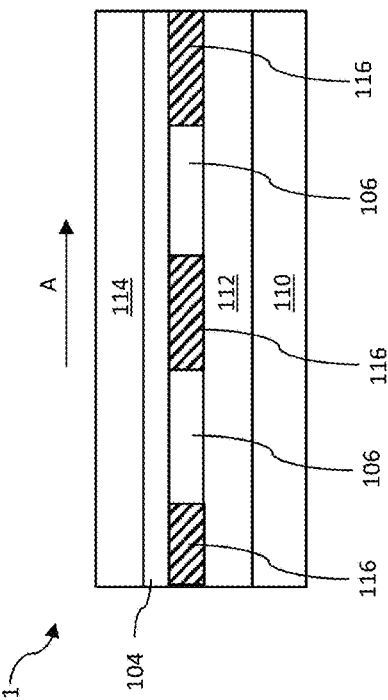

FIGS. 7a and 7b further illustrates how the waveguide design as discussed in relation to FIGS. 6a and 6b may be used in a sensor structure 1 of the present disclosure. FIG. 7a shows a top view of the sensor structure whereas FIG. 7b shows a section through the closed loop resonator 2 along line C. The direction of the propagating electromagnetic filed during use is indicated with arrow "A".

As seen in FIGS. 7a and 7b, the waveguide structure 100 as described in relation to FIGS. 6a and 6b forms the sensor elements 3a and 3b of the sensor structure 1. The second waveguide part 104, i.e. the "slab part" of the waveguide, forms part of the closed loop resonator 2, and the sensing elements 3a and 3b in the form of flexible membranes are formed out of both the layer 114 of cladding material and the second waveguide part 104. The second waveguide part 104 and the layer 114 of cladding material may thus be designed to provide desirable properties of the membrane. The membranes of the sensing elements 3a and 3b may be configured to be deformed upon receiving a sound pressure wave. The deformation of the membrane will cause a change in the size of the gap 106, which will thus affect the propagation properties of the closed loop resonator 2.

However, as an alternative, the structure of FIGS. 6a and 6b may be flipped upside-down and be used in the sensor structure 1. In such an embodiment, layer 110 and the first waveguide part 102, i.e. the "rib-part" of the waveguide, may form are part of a flexible membrane of the sensing elements 3a and 3b, whereas the slab part 104 of the waveguide and the 104) and the layer 114 of cladding material are arranged on a fixed substrate.

In between the sensor elements 3a and 3b, the gap 106 is replaced by a spacer or support 116, such as silicon dioxide. Consequently, as seen in FIG. 7b, the closed-loop resonator 2 arranged at a plurality of sensor elements comprises of both split-rib waveguides at the position of the sensing elements but also of connecting waveguides where the gap is filled with e.g. a SiO2 spacer.

In the above, the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A sensor structure for an acoustical pressure sensor, comprising
an optical waveguide closed-loop resonator and
a plurality of sensor elements, wherein the individual sensor elements of the plurality of sensor elements are configured to be affected by an acoustical pressure wave such that a physical property of the individual sensor element is changed; and wherein
the optical waveguide closed-loop resonator is arranged at said plurality of sensor elements and associated with each of the individual sensor elements of the plurality of sensor elements such that a resonance frequency of the optical waveguide closed-loop resonator is shifted due to the affected physical properties of all individual sensor elements of the plurality of sensor elements.

2. A sensor structure according to claim 1, wherein each of the individual sensor elements comprises a flexible portion and wherein the physical property affected by the acoustical pressure wave is a deformation of the flexible portion of the sensor element.

3. A sensor structure according to claim 2, wherein the closed-loop optical waveguide resonator associated with individual sensor element of the plurality of sensor elements is attached to the flexible portion such that the closed-loop optical waveguide resonator also deforms upon deformation of said flexible portion.

4. A sensor structure according to claim 2, wherein a part of the optical closed-loop waveguide associated with the individual sensor elements of the plurality of sensor elements is partially attached to the flexible portion and partially attached to a fixed portion such that a deformation of the flexible portion affects the propagation of the electromagnetic wave in said part of the optical closed-loop waveguide.

5. A sensor structure according to claim 1, wherein the plurality of sensor elements is configured with a specific sound receive radiation pattern.

6. A sensor structure according to claim 5, wherein the plurality of sensor elements is configured to have an acoustical focus in one or two dimensions.

7. A sensor structure according to claim 1, wherein the plurality of sensor elements form an elongated sensor area.

8. A sensor structure according to claim 7, wherein the optical waveguide closed-loop resonator comprises at least two parallel portions extending along a longitudinal direction of the elongated shape, wherein at least two parallel portions are connected by loops at ends of the parallel portions, wherein the parallel portions are arranged at the plurality of sensor elements.

9. An opto-mechanical sensor for detecting acoustical pressure waves comprising
at least one sensor structure according to claim 1;
at least one optical waveguide arranged for transmitting an electro-magnetic wave to said at least one sensor structure such that part of the spectrum of the electro-magnetic wave is coupled into said optical waveguide closed-loop resonator of the at least one sensor structure.

10. An opto-mechanical sensor according to claim 9, wherein the sensor comprises a plurality of sensor structures having sensor elements forming elongated sensor areas in an X-Y plane such that each of the elongated sensor areas are elongated in the Y direction and have a length in the Y direction that larger than the wavelength of the acoustical pressure waves to be detected, and wherein each of the plurality of sensor elements of the plurality of sensor structures has an acoustical focus in a Y direction, thereby allowing imaging in an X-Z plane using recordings of the plurality of sensor structures; wherein the Z-direction is the direction of the normal of the X-Y plane.

11. An opto-mechanical sensor according to claim 9, wherein the sensor comprises a plurality of sensor structures and wherein a single optical waveguide of the at least one optical waveguide is arranged to couple at least part of the spectrum of the electro-magnetic wave into the optical-waveguide closed-loop resonators of the plurality of sensor structures.

12. An opto-mechanical sensor according to claim 9, wherein the sensor comprises at least two sensor structures and at least two optical waveguides, and wherein the sensor structures and optical waveguides are arranged so that there is one optical waveguide for transmitting an electro-magnetic wave to each sensor structure, and wherein the opto-mechanical sensor further comprises a
wavelength division multiplexing (WDM) unit for splitting the bandwidth of electro-magnetic waves transmitted to the opto-mechanical sensor into a plurality of wavelength channels such that each individual sensor structure of the at least two sensor structures may be addressed by one individual wavelength channel.

13. An opto-mechanical sensor according to claim 12, wherein the WDM unit comprises a spectral filter having channels with wavelength-bandwidths that are wider than the free-spectral range of the optical waveguide closed-loop resonators of the at least two sensor structures, such that at least one channel contains at least one resonance of an individual optical waveguide closed-loop resonator of the at least two sensor structures.

14. An opto-mechanical sensor system comprising
an opto-mechanical sensor according to claim 9;
at least one light source for generating an electro-magnetic wave into the at least one optical waveguide of the opto-mechanical sensor; and
at least one photo-detector for detecting an electro-magnetic wave that has been transmitted in the optical waveguide of the opto-mechanical sensor.

15. An opto-mechanical sensor system according to claim 14, wherein said at least one light source is configured to emit light of a first wavelength that is tuned to a flank of the optical resonance frequency of the optical waveguide closed-loop resonators of the at least one sensor structure.

\* \* \* \* \*